United States Patent
Norieda et al.

(10) Patent No.: US 10,698,535 B2
(45) Date of Patent: Jun. 30, 2020

(54) INTERFACE CONTROL SYSTEM, INTERFACE CONTROL APPARATUS, INTERFACE CONTROL METHOD, AND PROGRAM

(71) Applicant: NEC CORPORATION, Tokyo (JP)

(72) Inventors: Shin Norieda, Tokyo (JP); Makoto Yoshimoto, Tokyo (JP); Yoshinori Saida, Tokyo (JP)

(73) Assignee: NEC CORPORATION, Tokyo (JP)

( * ) Notice: Subject to any disclaimer, the term of this patent is extended or adjusted under 35 U.S.C. 154(b) by 189 days.

(21) Appl. No.: 15/575,186

(22) PCT Filed: Apr. 18, 2016

(86) PCT No.: PCT/JP2016/062240
§ 371 (c)(1),
(2) Date: Nov. 17, 2017

(87) PCT Pub. No.: WO2016/185845
PCT Pub. Date: Nov. 24, 2016

(65) Prior Publication Data
US 2018/0150186 A1    May 31, 2018

(30) Foreign Application Priority Data
May 21, 2015 (JP) .................................. 2015-103905

(51) Int. Cl.
*G06F 3/042* (2006.01)
*G06F 3/0346* (2013.01)
(Continued)

(52) U.S. Cl.
CPC ....... *G06F 3/0426* (2013.01); *G02B 27/0172* (2013.01); *G06F 1/163* (2013.01);
(Continued)

(58) Field of Classification Search
CPC .................................. G06F 3/011; G06F 3/017
See application file for complete search history.

(56) References Cited

U.S. PATENT DOCUMENTS 6,771,294 B1 * 8/2004 Pulli ....................... G06F 3/011
  345/173
8,228,315 B1   7/2012 Starner et al.
(Continued)

FOREIGN PATENT DOCUMENTS

CN   1714388 A   12/2005
CN   104603865 A   5/2015
(Continued)

OTHER PUBLICATIONS

International Search Report for PCT/JP2016/062240 dated Jul. 19, 2016.
(Continued)

*Primary Examiner* — Patrick F Marinelli
(74) *Attorney, Agent, or Firm* — Sughrue Mion, PLLC

(57) ABSTRACT

An interface control system (2000) includes a first marker detection unit (2020) and a display control unit (2040). The first marker detection unit (2020) detects a first marker (50) attached to the body of a user based on a captured image obtained from a camera (20) worn by the user. The display control unit (2040) displays an operation image on a display screen (32) of a head mounted display 30 mounted on the user based on the first marker detected by the first marker detection unit (2020). The display control unit (2040) displays the operation image so that the operation image is viewed to be superimposed on the arm portion of the user when viewed with the eyes of the user.

17 Claims, 37 Drawing Sheets

(51) Int. Cl.
*G06F 3/01* (2006.01)
*G06K 9/32* (2006.01)
*G06K 9/00* (2006.01)
*G06F 3/0488* (2013.01)
*G06F 1/16* (2006.01)
*G06F 3/03* (2006.01)
*G06F 3/041* (2006.01)
*G02B 27/01* (2006.01)

(52) U.S. Cl.
CPC .............. *G06F 3/011* (2013.01); *G06F 3/014* (2013.01); *G06F 3/017* (2013.01); *G06F 3/0304* (2013.01); *G06F 3/0346* (2013.01); *G06F 3/0418* (2013.01); *G06F 3/04886* (2013.01); *G06K 9/00664* (2013.01); *G06K 9/00671* (2013.01); *G06K 9/3216* (2013.01); *G02B 2027/014* (2013.01); *G02B 2027/0138* (2013.01); *G02B 2027/0178* (2013.01)

(56) References Cited

U.S. PATENT DOCUMENTS

| | | | | |
|---|---|---|---|---|
| 8,471,868 | B1* | 6/2013 | Wilson | G06F 3/017 |
| | | | | 345/156 |
| 8,743,079 | B2* | 6/2014 | Norieda | G06F 1/163 |
| | | | | 345/156 |
| 9,069,164 | B2* | 6/2015 | Starner | G02B 27/017 |
| 9,195,303 | B2* | 11/2015 | Norieda | G04G 21/04 |
| 9,377,850 | B2* | 6/2016 | Norieda | G06F 3/011 |
| 9,727,131 | B2* | 8/2017 | Lim | G06F 3/011 |
| 9,817,628 | B2* | 11/2017 | Sugiyama | G06F 3/1454 |
| 9,829,986 | B2* | 11/2017 | Yun | G02B 27/0172 |
| 9,857,971 | B2* | 1/2018 | Chang | G06F 3/0426 |
| 9,922,462 | B2* | 3/2018 | Miller | G06F 3/011 |
| 9,958,902 | B2* | 5/2018 | Norieda | G06F 1/163 |
| 9,971,408 | B2* | 5/2018 | Gustin | G06F 3/016 |
| 2004/0070563 | A1* | 4/2004 | Robinson | H04N 9/3129 |
| | | | | 345/156 |
| 2004/0095311 | A1 | 5/2004 | Tarlton et al. | |
| 2006/0007056 | A1* | 1/2006 | Ou | G02B 27/017 |
| | | | | 345/8 |
| 2008/0248781 | A1* | 10/2008 | Cedo Perpinya | G06Q 30/02 |
| | | | | 455/412.1 |
| 2010/0199232 | A1* | 8/2010 | Mistry | G06F 1/163 |
| | | | | 715/863 |
| 2013/0002544 | A1* | 1/2013 | Norieda | G04G 21/04 |
| | | | | 345/156 |
| 2013/0009870 | A1* | 1/2013 | Norieda | G06F 3/011 |
| | | | | 345/156 |
| 2013/0013229 | A1* | 1/2013 | Norieda | G06F 3/011 |
| | | | | 702/56 |
| 2013/0016070 | A1* | 1/2013 | Starner | G02B 27/017 |
| | | | | 345/175 |
| 2015/0016777 | A1 | 1/2015 | Abovitz et al. | |
| 2015/0199167 | A1* | 7/2015 | Sugiyama | G06F 3/1454 |
| | | | | 345/2.3 |
| 2015/0323998 | A1 | 11/2015 | Kudekar et al. | |
| 2016/0026253 | A1* | 1/2016 | Bradski | G02B 27/225 |
| | | | | 345/8 |
| 2017/0212593 | A1* | 7/2017 | Gustin | G06F 3/016 |
| 2017/0255838 | A1* | 9/2017 | Norieda | G06K 9/4671 |
| 2017/0344124 | A1* | 11/2017 | Douxchamps | G06T 19/006 |
| 2018/0032146 | A1* | 2/2018 | Yun | G02B 27/0172 |
| 2018/0150186 | A1* | 5/2018 | Norieda | G06F 3/0346 |

FOREIGN PATENT DOCUMENTS

| | | |
|---|---|---|
| EP | 1579416 A1 | 9/2005 |
| JP | 2002-318652 A | 10/2002 |
| JP | 2006-506737 A | 2/2006 |
| JP | 2009-251154 A | 10/2009 |
| JP | 2011-134127 A | 7/2011 |
| JP | 2015-504616 A | 2/2015 |
| JP | 2016-126589 A1 | 7/2016 |
| KR | 20050083908 A | 8/2005 |
| WO | 2004/047069 A1 | 6/2004 |
| WO | 2004047069 A1 | 6/2004 |
| WO | 2013/168508 A1 | 11/2013 |
| WO | 2014/162825 A1 | 10/2014 |
| WO | 2014/188798 A1 | 11/2014 |

OTHER PUBLICATIONS

Decision to Grant a Patent dated Jan. 9, 2018 issued by the Japanese Patent Office in counterpart application No. 2017-519077.
Written Opinion of the International Searching Authority for PCT/JP2016/062240 dated Jul. 19, 2016.
Communication dated Nov. 5, 2019 from the State Intellectual Property Office of the P.R.C. in application No. 201680029080.0.

* cited by examiner

FIG. 15

| ID | FEATURE OF COLOR | FEATURE OF SHAPE | FEATURE OF PATTERN |
|---|---|---|---|
| 001 | BLACK | STRAIGHT LINE | ABSENT |
| 002 | BROWN | CURVED LINE | WOOD PATTERN |
| ... | ... | ... | ... |

INTERFACE CONTROL SYSTEM, INTERFACE CONTROL APPARATUS, INTERFACE CONTROL METHOD, AND PROGRAM

CROSS REFERENCE TO RELATED APPLICATIONS

This application is a National Stage of International Application No. PCT/JP2016/062240 filed Apr. 18, 2016, claiming priority based on Japanese Patent Application No. 2015-103905 filed May 21, 2015, the contents of all of which are incorporated herein by reference in their entirety.

TECHNICAL FIELD

The present invention relates to an interface control system, an interface control apparatus, an interface control method, and a program.

BACKGROUND ART

Various interfaces have been developed in which an image is displayed in a view of a user wearing a head mounted display as one of input interfaces, and the user applies an operation to the image so that the user can perform input.

Patent Document 1 discloses a technique in which an image displayed in a view of a user by a head mounted display is operated by using a mobile terminal of the user. Specifically, among images displayed in the view of the user, the user holds the mobile terminal so that a touch panel of the mobile terminal is superimposed on an image desired to be operated, and the image displayed on the head mounted display is operated by applying an operation to the touch panel.

Patent Document 2 discloses a technique of performing input by using a virtual keyboard displayed on a head mounted display. Patent Document 2 discloses a technique in which the virtual keyboard is fixed to an object on a real space, and thus a position of the virtual keyboard is not changed even if the head of a person wearing the head mounted display is moved.

Patent Document 3 discloses a technique in which an annotation is virtually added to an object on a real space which is seen through a head mounted display by using a tablet terminal cooperating with the head mounted display.

Patent Document 4 discloses a technique in which a menu screen is displayed on the palm of a user, or the menu screen is changed according to a gesture of the palm (for example, a gesture of opening the palm).

RELATED DOCUMENT

Patent Document

[Patent Document 1] International Publication No. 2014/188798

[Patent Document 2] PCT Japanese Translation Patent Publication No. 2015-504616

[Patent Document 3] International Publication No. 2014/162825

[Patent Document 4] U.S. Patent Application Publication No. 2015/0016777

SUMMARY OF THE INVENTION

Technical Problem

An image for an operation (hereinafter, referred to as an operation image) displayed on a display screen of a head mounted display is preferably displayed at a position or in a posture to be easily handled by a user. In relation to this fact, in a case of Patent Document 1, an operation image is fixed to the front side of a view of a user, and thus obstructs the view of the user when the user wants to view other objects. In a case of Patent Document 2, an operation image is fixed to a real object such as a desk, and thus cannot be operated while a user changes a visual line direction and views other places. Also in Patent Document 3, in the same manner as in Patent Document 2, an image (annotation) is fixedly allocated to a real object. Patent Document 4 does not disclose a technique in which, in a case where a user moves the hand thereof, a position of an operation image is changed in accordance therewith.

The present invention has been made in light of the above-described problems. An object of the present invention is to provide a technique for improving convenience of an input interface using a head mounted display.

Solution to Problem

According to the present invention, there is provided an interface control system including: a detection unit detecting a first marker attached to the body of a user based on an image obtained from a camera attached to the user; a display control unit displaying an operation image on a display screen of a head mounted display mounted on the user based on the first marker detected by the detection unit so that the operation image is superimposed on the body of the user and is visually recognized by the user; and an operation detection unit determining whether or not the operation image is operated by the user.

According to the present invention, there is provided an interface control apparatus including each unit of the interface control system of the present invention.

According to the present invention, an interface control method is an interface control method executed by a computer. The interface control method includes: a detection step of detecting a first marker attached to the body of a user based on an image obtained from a camera attached to the user; a display control step of displaying an operation image on a display screen of a head mounted display mounted on the user based on the first marker detected in the detection step so that the operation image is superimposed on the body of the user and is visually recognized by the user; and an operation detection step of determining whether or not the operation image is operated by the user.

According to the present invention, there is provided a program causing a computer to execute the interface control method of the present invention.

Advantageous Effects of Invention

According to the present invention, it is possible to provide a technique for improving convenience of an input interface using a head mounted display.

BRIEF DESCRIPTION OF THE DRAWINGS

The above-described object, and other objects, features and advantages will become more apparent based on preferred embodiments described below and the following accompanying drawings.

FIG. 15 is a diagram illustrating information regarding the first marker in a table form.

DESCRIPTION OF EMBODIMENTS

Figure 1:
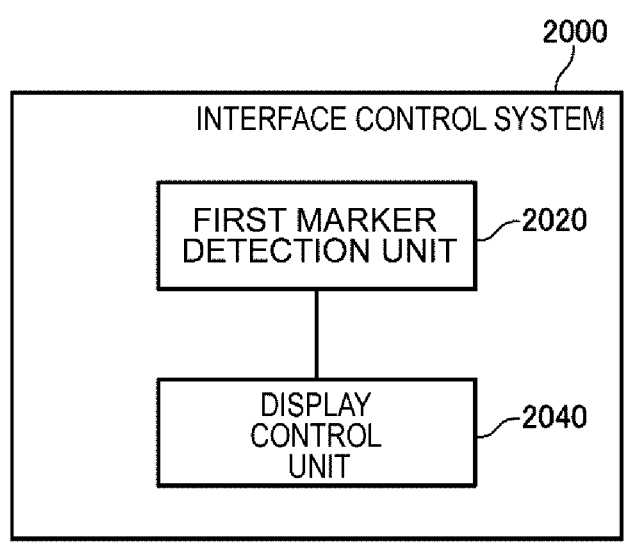
FIG. 1 is a block diagram illustrating an interface control system according to Example Embodiment 1.

Hereinafter, example embodiments of the present invention will be described with reference to the drawings. The same constituent elements are given the same reference numerals throughout all the drawings, and description thereof will not be repeated as appropriate.

Example Embodiment 1

FIG. 1 is a block diagram illustrating an interface control system 2000 according to Example Embodiment 1. In FIG. 1, each block indicates not a configuration in the hardware unit but a configuration in the functional unit.

The interface control system 2000 includes a first marker detection unit 2020 and a display control unit 2040. The first marker detection unit 2020 detects a first marker attached to a user's body based on a captured image obtained from a camera worn by the user. Here, the "camera worn by the user" may be a camera directly mounted on the user's body, or may be a camera mounted on any object worn by the user. In addition, the phrase that "the first marker is attached to the user's body" generally includes a state in which the first marker is located on the user's body, and is not limited to only a state in which the first marker is fixed to the user's body.

A first marker 50 is any marker at least the position of which can be determined in a captured image. For example, the first marker 50 is a marker which can be used to determine a three-dimensional coordinate system. A marker which can be used to determine a three-dimensional coordinate system is, for example, an augmented reality (AR) marker. However, a marker which can be used to determine a three-dimensional coordinate system is not limited to an AR marker as long as three directions being orthogonal to each other from a certain reference point are constantly obtained regardless of reference directions.

The first marker may be attached to any location of the user's body. For example, the first marker is attached to an arm portion of the user. Here, the arm portion of the user represents a portion including not only the arm but also the arm and the hand.

For example, the first marker 50 is an image displayed on a display screen of a device attached to the arm portion of the user. This device is any electronic apparatus having a function of displaying an image on a display screen. Note that the device may be directly attached on the arm portion of the user, or may be attached to the arm portion of the user over the clothes.

Figure 2:
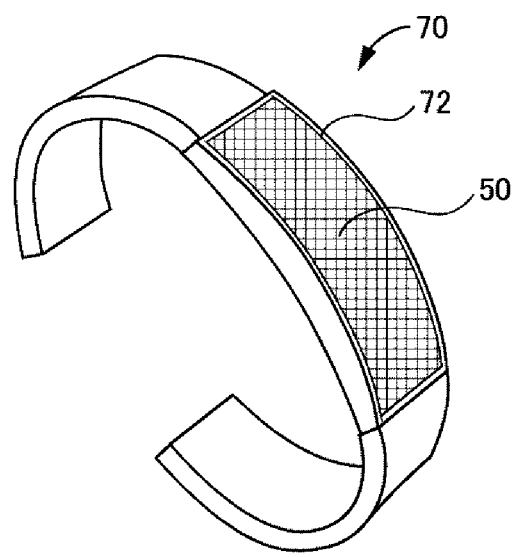
FIG. 2 is a diagram illustrating a device on which a first marker is displayed.

FIG. 2 is a diagram illustrating a device 70 on which the first marker 50 is displayed. The device 70 in FIG. 2 is a watch type device attached to the wrist of the user. A display screen 72 is a display screen of the device 70. In FIG. 2, an image shaded with diagonal lines displayed on the display screen 72 is the first marker 50. Note that the device 70 is not limited to watch type device.

The first marker 50 may be an image stored in the device 70 in advance, or may be an image stored in a storage device located outside the device 70. In the latter case, the device 70 acquires the first marker 50 to be displayed from the storage device, and displays the first marker.

The first marker 50 is not limited to being displayed on the device 70 as described above. The first marker 50 may be directly drawn on the arm portion of the user, or may be drawn on any object present on the arm portion of the user. In the latter case, for example, the first marker 50 is drawn on a ring worn on the finger of the user, a wrist band worn on the wrist of the user, or a sleeve of clothes worn by the user. Note that the first marker 50 may be drawn by the hand, or may be printed. The marker 50 may be a specific part of the user's body. For example, the marker 50 is the back of the hand of the user.

The display control unit 2040 displays an operation image on a display screen 32 of a head mounted display mounted on the user based on a first marker detected by the first marker detection unit 2020. The display control unit 2040 displays the operation image so that the operation image is viewed to be superimposed on the user's body when viewed with the eyes of the user. A specific display method thereof will be described later.

The operation image is an image which is operated in order for the user to perform an input operation on various computers. For example, in a case where the operation image is a keyboard image, the user applies an operation to a key image included in the keyboard image so as to input a character corresponding to the key.

Figure 3:
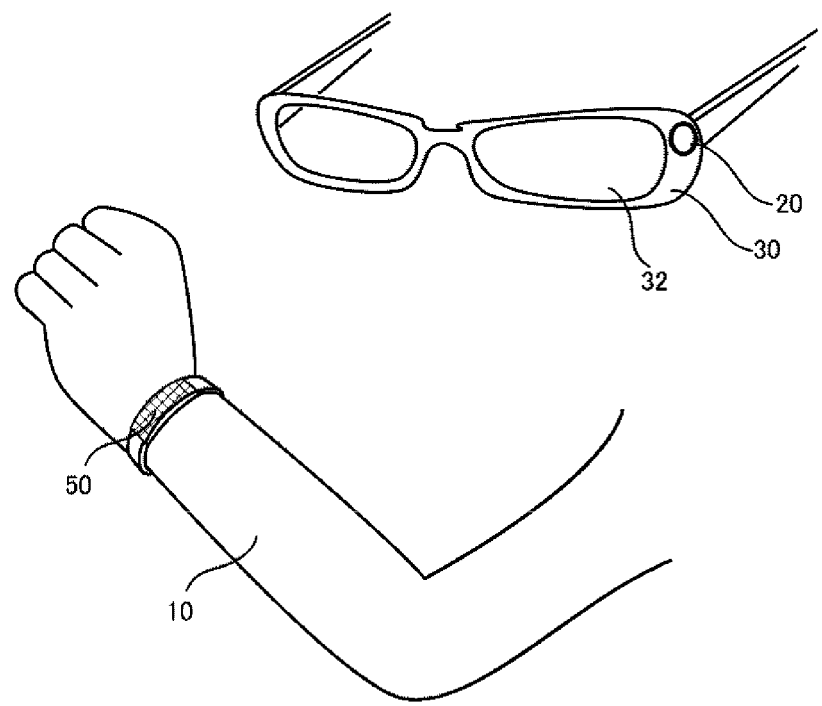
FIG. 3 illustrates a scene in which a use scene of the interface control system is viewed from the outside of a view of a user.
Figure 4:
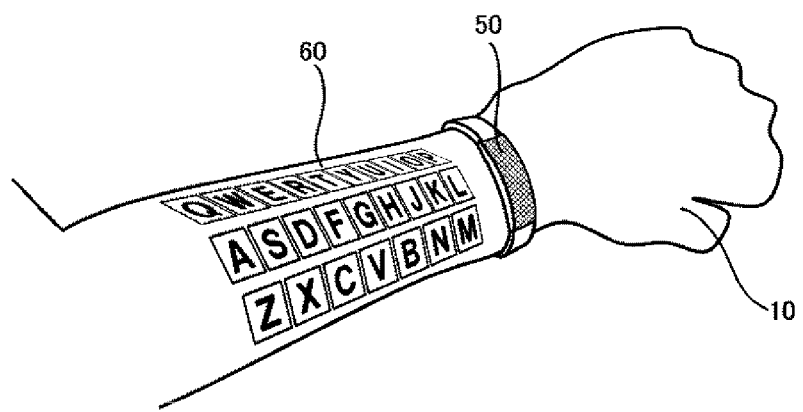
FIG. 4 is a diagram illustrating a scene captured in the view of the user currently using the interface control system.

With reference to FIGS. 3 and 4, a usage pattern of the interface control system 2000 of the present example embodiment will be exemplified. FIG. 3 illustrates a scene in which a use scene of the interface control system 2000 is viewed from the outside of a view of a user. On the other hand, FIG. 4 is a diagram illustrating a scene reflected in the view of the user currently using the interface control system 2000.

A head mounted display 30 in FIG. 3 is a glasses type head mounted display. The display screen 32 is a transmissive display provided in a lens portion of the head mounted display 30. A camera 20 is a camera worn by the user. In FIG. 3, the camera 20 is attached around the lens of the head mounted display 30. Note that, as will be described later, the display screen 32 is not limited to transmissive display. An installation position of the camera 20 is not limited to the head mounted display 30.

In FIGS. 3 and 4, the first marker 50 is provided on the wrist of the user. The interface control system 2000 displays an operation image 60 on the display screen 32 based on a captured image which is generated by the camera 20 and in which the first marker 50 is captured. The operation image 60 is a keyboard image. The operation image 60 is displayed on the display screen 32 so as to be superimposed on the arm portion 10 viewed from the user. As a result, as illustrated in FIG. 4, the operation image 60 appears to be superimposed on the arm portion 10. Here, as illustrated in FIG. 4, the display control unit 2040 preferably displays a shape of the operation image 60 by modifying (for example, curving) the shape according to a display position. However, the display control unit 2040 may display a shape of the operation image 60 without modifying the shape.

Here, the device 70 may have a function of performing communication with the head mounted display 30, or may not have the function. Note that, in a case where the device 70 is configured not to perform communication with the head mounted display 30, settings (pairing or the like) for communication therebetween is not necessary, and thus there is an advantage that the time and effort for preparation for using the interface control system 2000 are reduced.

Figure 5:
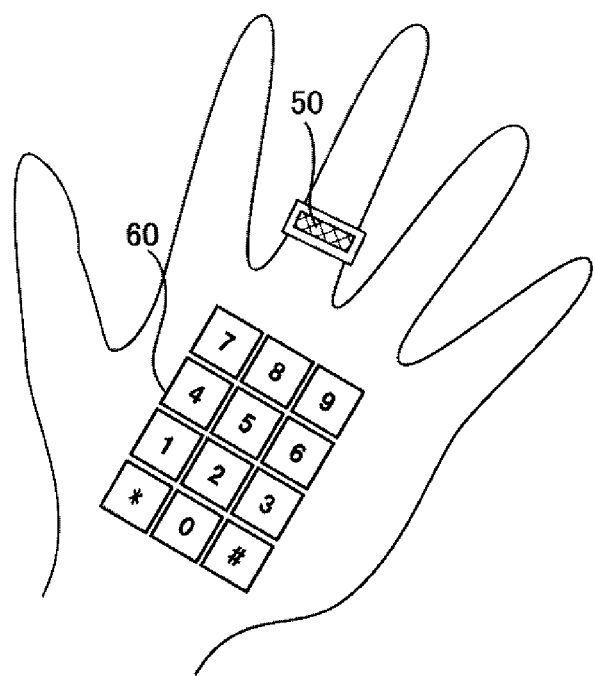
FIG. 5 is a diagram illustrating another example of a usage pattern of the interface control system.

A usage pattern of the interface control system 2000 is not limited to the examples illustrated in FIGS. 3 and 4. FIG. 5 is a diagram illustrating another example of a usage pattern of the interface control system 2000. In FIG. 5, the first marker 50 is attached to a ring worn on the finger of the user. The display control unit 2040 displays the operation image 60 on the display screen 32 so that the operation image 60 is viewed to be superimposed on the palm of the user. Note that the ring in FIG. 5 may be a ring type device having a function of displaying the first marker 50.

Advantageous Effects

According to the interface control system 2000 of the present example embodiment, an operation image which is used for a user to perform an input operation is displayed on the display screen 32 of the head mounted display 30 so as to be viewed to be superimposed on the arm portion of the user. Here, since the operation image 60 is displayed based on a first marker located on the arm portion of the user, if the user moves the arm portion, the operation image 60 can be moved in accordance with the movement. Thus, the user can easily display the operation image 60 at a desired position or in a desired posture. Therefore, the interface control system 2000 of the present example embodiment is advantageous in that convenience of an input interface is high compared with an input interface in which a position or a posture of the operation image 60 is fixed.

Note that, preferably, a position to which the first marker 50 is attached and a position on a user's body superimposed on the operation image 60 have a positional relationship of not crossing a joint. For example, in the usage patterns illustrated in FIGS. 2 and 3, since the first marker 50 is located on the wrist, and the operation image 60 is displayed on the arm, this positional relationship is a positional relationship of not crossing a joint. In this positional relationship, even if a user performs an action (for example, an action of bending the wrist) of moving the body with a joint as an axis, there is no change in a relative positional relationship between display positions of the first marker 50 and the operation image 60, and thus the operation image 60 can be displayed in a more accurate posture or at a more accurate position. Therefore, the degree of freedom of an action of the user is increased. However, a position to which the first marker 50 is attached and a position on a user's body superimposed on the operation image 60 may have a positional relationship of crossing a joint.

Since the first marker 50 can be formed in a simpler shape than that of the arm portion of a user, a process of detecting the first marker 50 from an image is more easily performed than a process of detecting the arm portion of the user from the image. Thus, the interface control system 2000 of the present example embodiment is advantageous in that the operation image 60 can be displayed accurately within a short period of time with a small amount of computer resources.

There is an advantage that a user may not be required to memorize various gestures in the interface control system 2000 of the present example embodiment in which the user performs input by operating the operation image 60 compared with an input interface in which input is performed by the user making a gesture.

In an input interface in which input is performed by using a gesture, there is concern that input may be wrongly detected in a case where the user moves the hand for the purpose other than an input operation. On the other hand, in the interface control system 2000 of the present example embodiment, the operation image 60 is displayed in a case where the first marker 50 is captured in a captured image. Therefore, the user can easily separate an action for operating the operation image 60 from other actions depending on whether or not the first marker 50 is included in an imaging range of the camera 20. Thus, the interface control system 2000 of the present example embodiment is advantageous in that erroneous detection is reduced.

Similarly, also in an input interface in which an operation image is constantly displayed in a view of a user, there is concern that input may be wrongly detected in a case where the user moves the hand for the purpose other than an input operation. If the operation image is constantly displayed in the view of the user, the view is obstructed when the user wants to perform actions other than an input operation. In contrast, in the interface control system 2000 of the present example embodiment, since the operation image 60 is displayed in a case where the first marker 50 is captured in a captured image, there is less erroneous detection of input, and a view is not obstructed in a case where operations other than an input operation are desired to be performed. Thus, the interface control system 2000 of the present example embodiment is advantageous in that convenience of an input operation using an image is high.

Since a display location of the operation image 60 is restricted to the arm portion of the user, the background of the hand or the like of the user operating the operation image 60 is restricted to the arm portion of the user in a captured image. Thus, there is an advantage that a process of detecting the hand or the like of the user performing an operation from a captured image is facilitated compared with a case where a display location of an operation image is not restricted to the arm portion of the user (for example, in a case where the operation image is superimposed on any scenery viewed by the user). Note that a method of a user detecting an operation will be described in example embodiments which will be described later.

The configuration in which the first marker 50 is displayed on the device 70 is advantageous in that the first marker 50 can be easily displayed and changed compared with a method of directing drawing the first marker 50 on the arm portion of a user.

In the configuration in which the first marker 50 is displayed on the device 70, the device 70 may have not only the function of displaying the first marker 50 but also various functions. In this case, a single device such the device 70 can be used for various purposes. For example, an application (an application for displaying the first marker 50) for using the interface control system 2000 is installed in the device 70 as one of various applications installed in the device 70. This usage pattern has an advantage that a general purpose device can be effectively used, and an advantage that the interface control system 2000 can be easily introduced.

Figure 6:
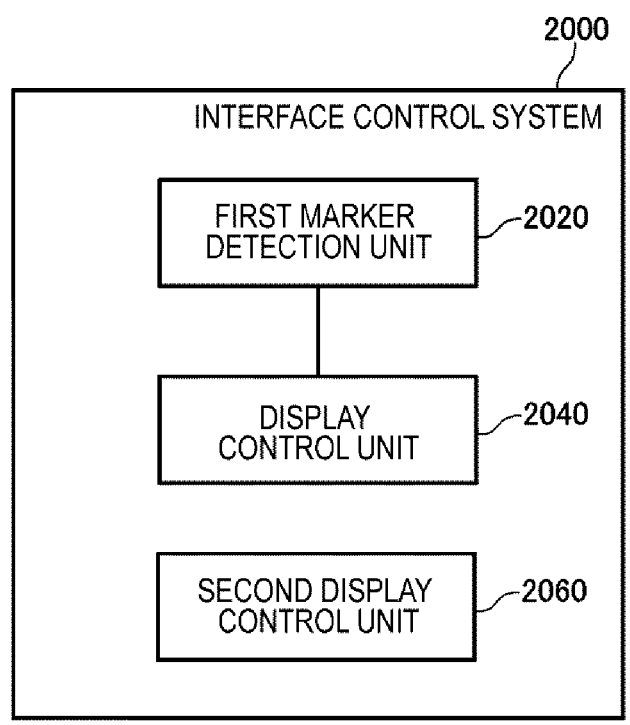
FIG. 6 is a block diagram illustrating an interface control system which further includes a second display control unit.

Hereinafter, the interface control system 2000 of the present example embodiment will be described more in detail. Note that, in the following description, in the present example embodiment and each example embodiment will be described later, the embodiment illustrates that the first marker 50 is displayed on the display screen 72 of the device 70. In a case where the first marker 50 is displayed on the display screen 72 of the device 70, the interface control system 2000 further includes a second display control unit 2060 which controls display of the first marker 50. FIG. 6 is a block diagram illustrating the interface control system 2000 further including the second display control unit 2060.

However, a method of implementing the interface control system 2000 described hereinafter is not limited to a method using the device 70. Each configuration described below is also applicable to an embodiment not using the device 70 within the scope in which the content thereof does not cause contradiction.

<Hardware Configuration Example>

Each functional configuration unit of the interface control system 2000 of Example Embodiment 1 may be realized by hardware (for example, a hard-wired electronic circuit), or may be realized by a combination of hardware and software (for example, a combination of an electronic circuit and a program for controlling the electronic circuit). Hereinafter, a further description will be made of a case where each functional configuration unit of the interface control system 2000 is realized by a combination of hardware and software.

Figure 7:
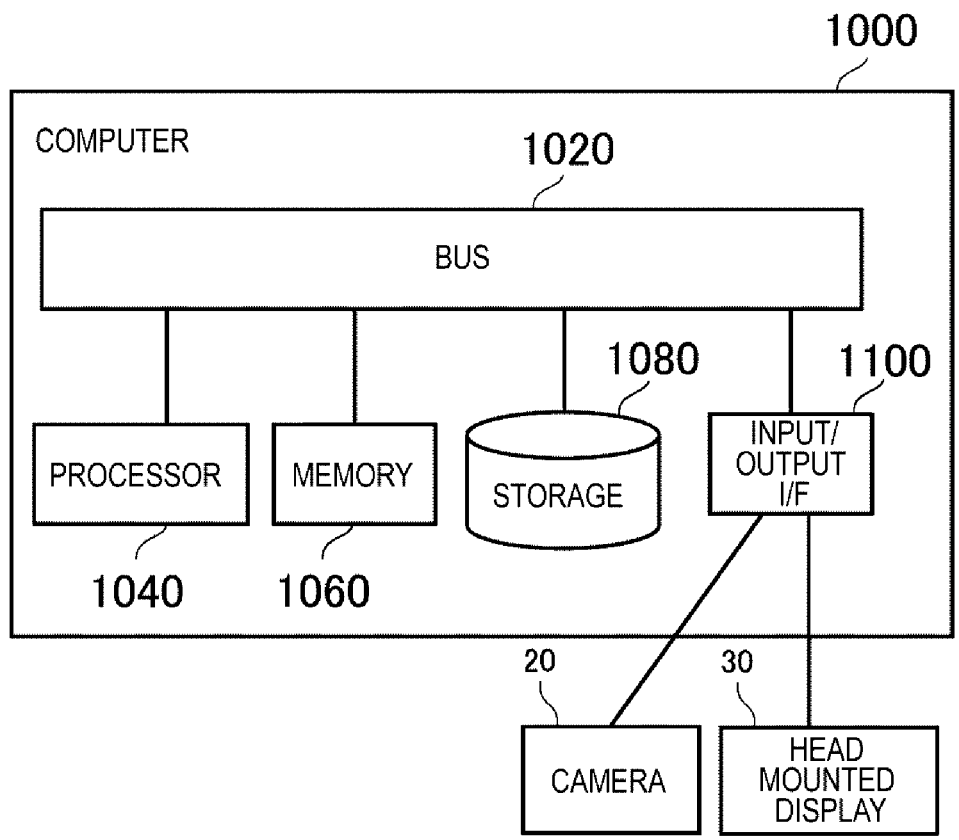
FIG. 7 is a block diagram illustrating a hardware configuration of a computer implementing the interface control system.

FIG. 7 is a block diagram illustrating a hardware configuration of a computer 1000 implementing the interface control system 2000. The computer 1000 is one of various computers used to implement the interface control system 2000. The computer 1000 may be a dedicated computer for implementing the interface control system 2000, or may be a general purpose computer in which various applications operate.

For example, the computer 1000 is the head mounted display 30. However, the computer 1000 may be computers (the device 70 or the like) other than the head mounted display 30. In this case, the head mounted display 30 displays the operation image 60 on the display screen 32 under the control of the computer 1000. The interface control system 2000 may be implemented by two or more computers. For example, the interface control system 2000 is implemented by using the head mounted display 30 and the device 70. In this case, for example, the first marker detection unit 2020 and the display control unit 2040 are implemented on the head mounted display 30, and the second display control unit 2060 is implemented on the device 70.

The computer 1000 includes a bus 1020, a processor 1040, a memory 1060, a storage 1080, and an interface 1100. The bus 1020 is a transmission path for transmitting and receiving data among the processor 1040, the memory 1060, the storage 1080, and the interface 1100. However, a method of connecting the processor 1040 and the like to each other is not limited to connection using a bus. The processor 1040 is, for example, a calculation processing device such as a central processing unit (CPU) or a graphics processing unit (GPU). The memory 1060 is, for example, a random access memory (RAM) or a read only memory (ROM). The storage 1080 is, for example, a storage device such as a hard disk, a solid state drive (SSD), or a memory card. The storage 1080 may be a memory such as a RAM or a ROM.

The interface 1100 connects the computer 1000 to external devices. For example, the interface 1100 includes a bus connection interface such as a universal serial bus (USB), or a network interface. The network interface may be an interface connected to a wireless line, or may be an interface connected to a wired line.

A device connected through the interface 1100 is, for example, the camera 20. However, the computer 1000 is not required to be directly connected to the camera 20 as long as a captured image generated by the camera 20 can be acquired. For example, in a case where the camera 20 stores a captured image in a storage device located outside the camera 20, the computer 1000 may be connected to the storage device.

In a case where the computer 1000 is provided outside the head mounted display 30, the computer 1000 is connected to the head mounted display 30 through, for example, the interface 1100.

The storage 1080 stores a program for realizing each function of the interface control system 2000. Specifically, the storage 1080 stores a program module for realizing each functional configuration unit. The processor 1040 realizes a function of each functional configuration unit of the interface control system 2000 by executing each program module. Here, when each module is executed, the processor 1040 may execute the module after reading the module to the memory 1060, or may execute the module without reading the module to the memory 1060.

A hardware configuration of the interface control system 2000 is not limited to the configuration illustrated in FIG. 7. For example, each program module may be stored in the memory 1060. In this case, the interface control system 2000 may not include the storage 1080.

<<Head Mounted Display 30>>

The head mounted display 30 is any head mounted display having the display screen 32 included in a view of a user. For example, the display screen 32 is a non-transmissive display. In this case, the head mounted display 30 displays an image captured by a camera imaging the periphery (for example, a user's face direction) of the user and images indicating other objects on the display screen 32 in a superimposed manner. The user can view a scene in which other objects are superimposed on a surrounding scene by viewing the display screen 32. Therefore, the interface control system 2000 displays the operation image 60 superimposed on an image of the arm portion of the user captured by the camera, on the display screen 32. Note that the "camera imaging the periphery of the user" may be the camera 20, or may be a camera separately therefrom.

For example, the display screen 32 is a transmissive display. In this case, the user can view both of a real object located ahead of the display screen 32 and an image displayed on the display screen 32. Therefore, for example, the interface control system 2000 displays the operation image 60 on the display screen 32 so that the operation image 60 is viewed to be superimposed on the arm portion of the user located ahead of the display screen 32. For example, the interface control system 2000 may display the operation image 60 superimposed on an image of the arm portion of the user captured by a camera imaging the periphery of the user, on the display screen 32, in the same manner as in the case where the display screen 32 is a non-transmissive display.

<<Camera 20>>

The camera 20 is any camera which generates an image through capturing. The camera 20 may be a two-dimensional (2D) camera, or may be a three-dimensional (3D) camera.

Here, preferably, a relationship between an imaging direction of the camera 20 and a face direction of the user is recognized in advance in order to determine a display position of the operation image 60 viewed by the user by using a captured image generated by the camera 20. Thus, for example, the camera 20 is provided at a location where the imaging direction of the camera 20 and the face direction of the user are considered to match each other. In a case where the display screen 32 is a transmissive head mounted display, for example, this location is the vicinity of the lens of the head mounted display 30 described in FIG. 3. In a case where the display screen 32 is anon-transmissive head mounted display, and a camera imaging a peripheral scene to be displayed on the display screen 32 is the camera 20, it may be considered that an imaging direction of the camera matches the face direction of the user.

However, the camera 20 may be provided at a location where the imaging direction of the camera 20 and the face direction of the user are not considered to match each other. For example, in this case, the camera 20 is provided at any location of the head of the user (not limited to the head). In this case, a relationship between the imaging direction of the camera 20 and the face direction of the user (for example, angular shift) is defined as a parameter in advance. The interface control system 2000 recognizes the relationship between the imaging direction of the camera 20 and the face direction of the user by using the parameter. The parameter may be set in the interface control system 2000 in advance, or may be stored in a storage device which can be accessed by the interface control system 2000.

For example, the camera 20 may be attached to an object (an employee ID card or the like) held from the neck of the user. In this case, preferably, the interface control system 2000 displays the operation image 60 superimposed on an image of the arm portion of the user captured by the camera 20 on the display screen 32.

<Flow of Process>

Figure 8:
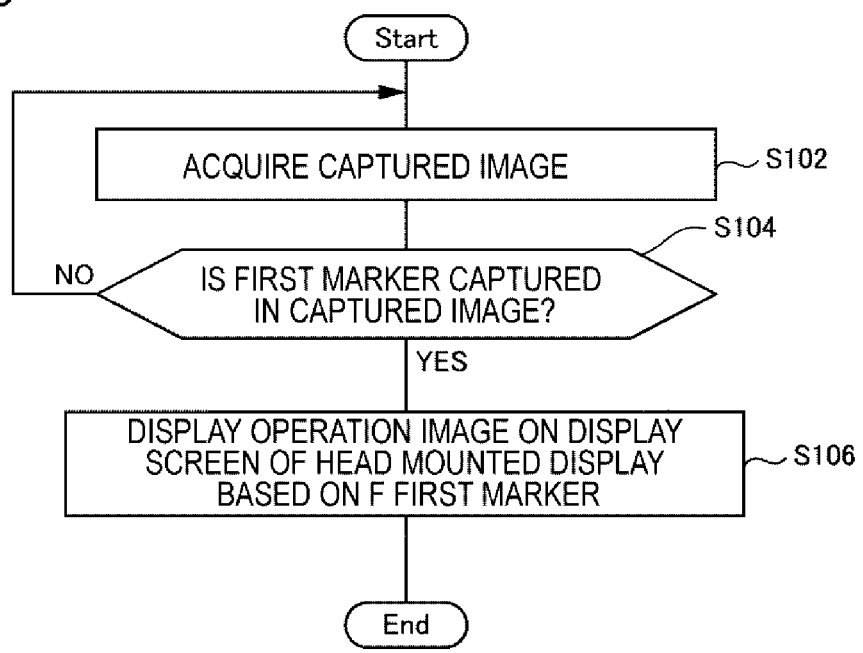
FIG. 8 is a flowchart illustrating a flow of a process performed by the interface control system according to Example Embodiment 1.

FIG. 8 is a flowchart illustrating a flow of a process performed by the interface control system 2000 of Example Embodiment 1. The first marker detection unit 2020 acquires a captured image generated by the camera 20 (S102). The first marker detection unit 2020 determines whether or not a first marker is captured in the acquired captured image (S104). In a case where the first marker is not captured (S104: NO), the process in FIG. 8 proceeds to S104. On the other hand, in a case where the first marker is captured (S104: YES), the process in FIG. 8 proceeds to S106. In S106, the display control unit 2040 displays the operation image 60 on the display screen 32 of the head mounted display 30 so that the operation image is superimposed on the arm portion of the user based on the first marker.

<Details of Process Performed by First Marker Detection Unit 2020>

The first marker detection unit 2020 acquires a captured image generated by the camera 20 (S102). The first marker detection unit 2020 may directly acquire a captured image from the camera 20, or may acquire a captured image from a storage device storing the captured image generated by the camera 20.

The first marker detection unit 2020 determines whether or not the first marker 50 is captured in the acquired captured image (S104). For example, the first marker detection unit 2020 has information regarding a shape, a size, a color, and the like of the first marker 50 in advance, and detects the first marker 50 from the acquired captured image by using the known information. Here, as a technique of determining whether or not a predetermined marker is captured in an image, for example, a known object detection technique of detecting a predetermined object from an image may be used. Details of this technique will not be described.

The first marker detection unit 2020 may start a process of detecting the first marker 50 at any timing. For example, the first marker detection unit 2020 constantly performs the process of detecting the first marker 50. For example, the first marker detection unit 2020 may start the process at a timing for which an instruction is given from the user. For example, this instruction is given by using a button or the like provided on the head mounted display 30.

For example, the first marker detection unit 2020 may start detection of the first marker 50 in a case where a predetermined situation is detected by analyzing the captured image. For example, the predetermined situation is a situation related to work performed by the user in the real world. For example, it is assumed that the user performs work of reading a meter and recording numerical values at a work site. In this case, the first marker detection unit 2020 starts detection of the first marker 50 in a case where it is detected that the meter is captured in a captured image. Note that a process of detecting the predetermined situation may be constantly performed, or may be started at a timing for which an instruction is given from the user. Here, information of "the kind of situations to be detected for starting the detection of the first marker 50" may be set in the first marker detection unit 2020 in advance, or may be stored in a storage device which can be accessed by the first marker detection unit 2020.

Similarly, the camera 20 may start imaging at any timing. For example, the camera 20 constantly performs imaging. For example, the camera 20 may start imaging at a timing at which the first marker detection unit 2020 starts a process of detecting the first marker 50.

The first marker detection unit 2020 starts the process of detecting the first marker 50, and then detects the first marker 50 from each of a plurality of captured images generated by the camera 20. The first marker detection unit 2020 may detect the first marker 50 from all captured images generated by the camera 20, or may detect the first marker 50 from a part of captured images. In the latter case, for example, the first marker detection unit 2020 detects the first marker 50 every predetermined number of captured images (for example, at a ratio of one to three captured images) among generated captured images.

<Details of Process Performed by Display Control Unit 2040>

In a case where the first marker 50 is detected by the first marker detection unit 2020 (S104: YES), the display control unit 2040 displays the operation image 60 on the display screen 32 of the head mounted display 30 so that the operation image is superimposed on the arm portion of the user based on the first marker 50 (S106). The display control unit 2040 determines at least one of a posture, a position, and a size of the operation image 60 based on the detected first marker 50 in order to display the operation image 60 so that the operation image 60 is viewed to be superimposed on the arm portion of the user. Hereinafter, such a determination method will be described.

<<Method of Determining Posture of Operation Image 60>>

Figure 9:
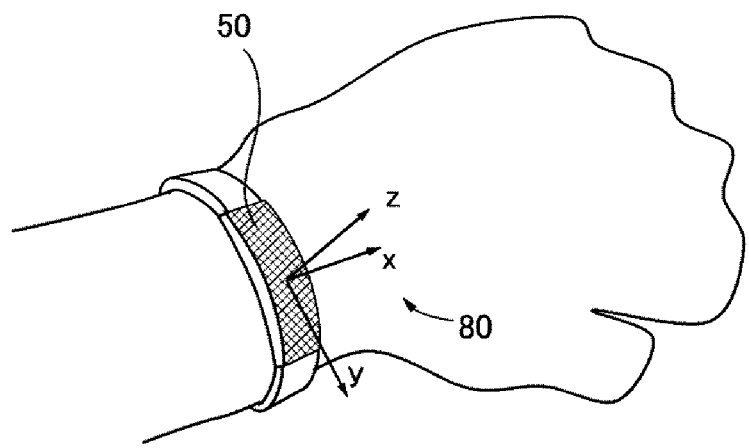
FIG. 9 is a diagram illustrating a coordinate system determined based on the first marker.

The display control unit 2040 determines a posture of the operation image 60 according to a posture of the first marker 50. Specifically, first, the display control unit 2040 determines a three-dimensional coordinate system corresponding to the first marker 50 by using the first marker 50 captured in the captured image. FIG. 9 is a diagram illustrating a coordinate system 80 determined based on the first marker 50. The coordinate system 80 is a three-dimensional coordinate system defined by an x direction, a y direction, and a z direction. Note that, as a technique of determining a three-dimensional coordinate system based on a shape of a marker captured in an image, for example, a known technique of determining a three-dimensional coordinate system by using an AR marker may be used. Thus, a detailed description of this technique will not be repeated.

Figure 10:
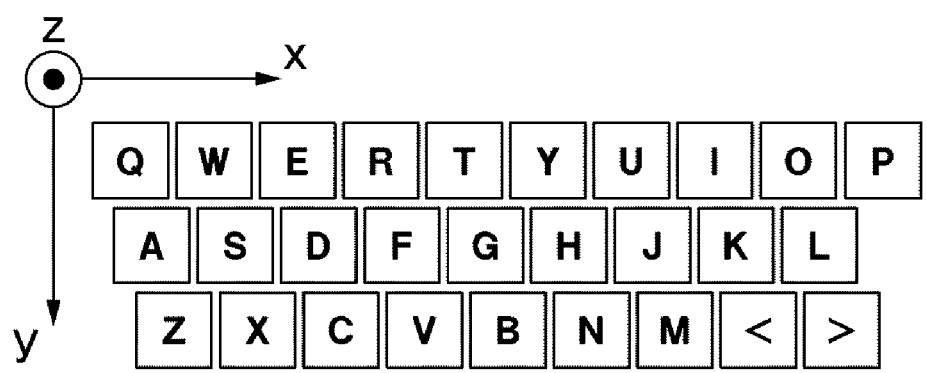
FIG. 10 is a diagram illustrating a correspondence relationship between the coordinate system and a posture of an operation image.

The display control unit 2040 determines a posture of the operation image 60 based on the determined coordinate system 80. For example, the determination is performed by using a predefined correspondence relationship between the coordinate system 80 and a posture of the operation image 60. FIG. 10 is a diagram illustrating a correspondence relationship between the coordinate system 80 and a posture of the operation image 60. In FIG. 10, the rightward direction when seen in a plan view of the operation image 60 is the x direction in the coordinate system 80, the downward direction when seen in a plan view of the operation image 60 is the y direction in the coordinate system 80, and a direction opposite to a visual line direction when seen in a plan view of the operation image 60 is the z direction in the coordinate system 80. This correspondence relationship may be set in the display control unit 2040 in advance, or may be stored in a storage device which can be accessed by the display control unit 2040. Note that, in a case where there are a plurality of types of operation images 60, the correspondence relationship is defined for each type of operation image 60.

However, the display control unit 2040 may not determine a posture of the operation image 60 by using the first marker 50. In this case, for example, the display control unit 2040 displays the operation image 60 in a fixed posture regardless of the first marker 50. For example, the display control unit 2040 calculates a region indicating the arm portion of the user on which the first marker 50 is located by analyzing a captured image, and calculates a posture (for example, an angle between the region and the x axis) of the region in a two-dimensional plane of the captured image. The display control unit 2040 determines a posture of the operation image 60 based on a posture of the arm portion of the user in the two-dimensional plane of the captured image. For example, the display control unit 2040 makes an angle between the x direction of the operation image 60 and the x axis of the two-dimensional plane of the captured image the same as an angle between the region describing the arm portion of the user and the x axis.

<<Determination of Size of Operation Image>>

The display control unit 2040 determines a size of the operation image 60 to be displayed on the display screen 32 according to a size of the first marker 50 captured in a captured image. For example, a ratio between a size of the first marker 50 and a size of the operation image 60 is defined in advance. The display control unit 2040 determines a size of the operation image 60 to be displayed on the display screen 32 based on the ratio and a size of the first marker 50 captured in a captured image. The ratio may be set in the display control unit 2040 in advance, or may be stored in a storage device which can be accessed by the display control unit 2040. Note that, in a case where there are a plurality of types of operation images 60, the ratio is defined for each type of operation image 60.

However, the display control unit 2040 may not determine a size of the operation image 60 by using the first marker 50. In this case, for example, the display control unit 2040 displays the operation image 60 at a fixed size regardless of the first marker 50. For example, the display control unit 2040 calculates a region indicating the arm portion of the user on which the first marker 50 is located by analyzing a captured image, and sets a size corresponding to an area of the region as a size of the operation image 60. The display control unit 2040 determines a size of the operation image 60 so that it is the maximum size within a range of being included in the region of the arm portion of the user.

<<Determination of Position of Operation Image 60>>

The display control unit 2040 determines a position of the operation image 60 to be displayed on the display screen 32 according to a position of the first marker 50 captured in a captured image. For example, a position of the operation image 60 is defined as a position in the above-described coordinate system 80 in advance. The position in the coordinate system 80 may be set in the display control unit 2040 in advance, or may be stored in a storage device which can be accessed by the display control unit 2040.

Figure 11:
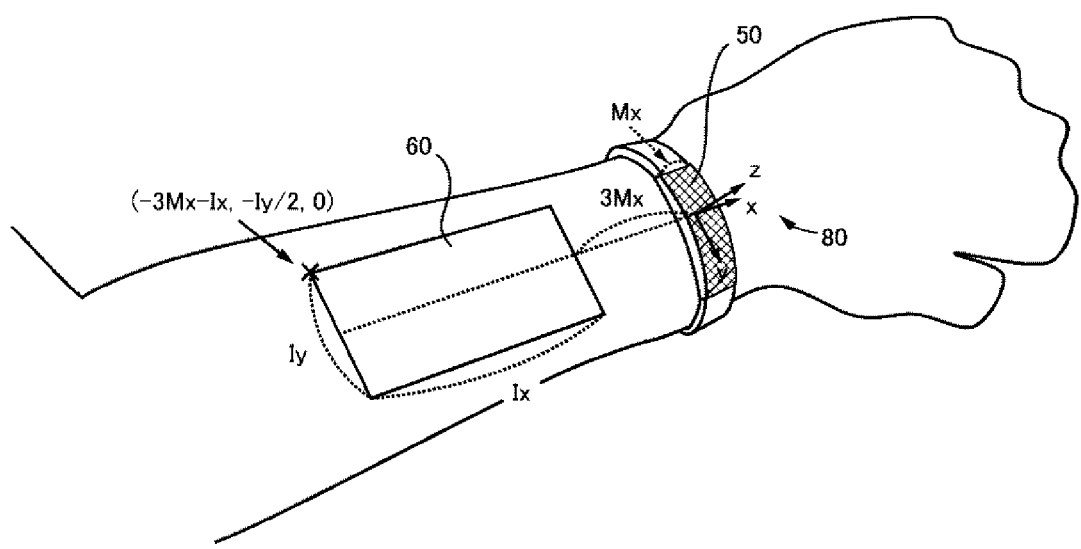
FIG. 11 is a diagram illustrating a position of an operation image in the coordinate system.

FIG. 11 is a diagram illustrating a position of the operation image 60 in the coordinate system 80. In the example illustrated in FIG. 11, a position of the operation image 60 in the coordinate system 80 is defined as (−3Mx−Ix, −Iy/2, 0) in advance. Here, Mx represents a size of the first marker 50 in the x direction, Ix represents a size of the operation image 60 in the x direction, and Iy represents a size of the operation image 60 in the y direction. A position of the operation image 60 represents a coordinate of the upper left part of the operation image 60.

The display control unit 2040 draws the operation image 60 so that a position in the coordinate system 80 becomes (−3Mx−Ix, −Iy/2, 0). Note that a posture of the operation image 60 is defined in the same manner as in the case described in FIG. 10, that is, "the rightward direction when seen in a plan view of the operation image 60 is the x direction in the coordinate system 80, the downward direction when seen in a plan view of the operation image 60 is the y direction in the coordinate system 80, and a direction opposite to a visual line direction when seen in a plan view of the operation image 60 is the z direction in the coordinate system 80".

However, the display control unit 2040 may not determine a position of the operation image 60 by using the first marker 50. In this case, for example, the display control unit 2040 calculates a region describing the arm portion of the user on which the first marker 50 is located by analyzing a captured image, and determines a position of the operation image 60 based on a position of the region. For example, the display control unit 2040 calculates the center of the region indicating the arm portion of the user, and determines a position of the operation image 60 so that the center of the operation image 60 is located at the center of the arm portion of the user.

<<Relationship Between Left and Right Arm Portions on which First Marker 50 is Located, and Position of Operation Image 60>>

A position of the operation image 60 differs depending on whether the first marker 50 is located on the left arm portion or the right arm portion of the user. There are various methods of taking this fact into consideration. For example, the arm portion on which the first marker 50 is located of the left and right arm portions is set in the interface control system 2000 in advance. The display control unit 2040 displays the operation image 60 at a position corresponding to this setting.

For example, the display control unit 2040 may determine whether it is the left arm portion or the right one on which the first marker 50 is located by analyzing a captured image. For example, the display control unit 2040 detects a region indicating the arm portion of the user from the captured image, divides the region into two regions with the first marker 50 as a boundary, and performs the determination based on areas or colors of the two regions. Herein, the first marker 50 is assumed to be located in a range from the wrist to the fingertip of the user.

In a case where the first marker 50 is located on the left arm portion of the user, the left region of the two regions has a larger area than that of the right region. On the other hand, in a case where the first marker 50 is located on the right arm portion of the user, the right region has a larger area than that of the left region. Therefore, the display control unit 2040 determines whether it is the left arm portion or the right one on which the first marker 50 is located based on a difference between the largeness of the areas of the two regions.

In the arm portion of the user, it is considered that the hand is a region which substantially entirely has a skin color, whereas the arm includes larger region having other than a skin color since it is often partially or entirely covered with clothes. Therefore, for example, the display control unit 2040 determines which region of the two divided regions has higher proportion of a skin color, thereby determining whether it is the left arm portion or the right one on which the first marker 50 is located. Specifically, the display control unit 2040 determines that the first marker 50 is located on the left arm portion in a case where the right region has higher proportion of a skin color, and determines that the first marker 50 is located on the right arm portion in a case where the left region has higher proportion of a skin color.

However, in a case where a proportion of a skin color is high in both of the regions, it is considered that the arms are not covered with clothes (for example, the user wears half sleeve clothes). Therefore, in a case where a proportion of a skin color is equal to or more than a predetermined value in both of the left and right regions, the display control unit 2040 may determine the left and right arm portions according to other methods instead of using a difference between proportions of a skin color. This predetermined value may be set in the display control unit 2040 in advance, or may be stored in a storage device which can be accessed by the display control unit 2040.

Both of a position of the operation image 60 in a case where the first marker 50 is located on the left arm portion and a position of the operation image 60 in a case where the first marker 50 is located on the right arm portion may be set in the interface control system 2000 in advance, or only one thereof may be set therein. In the latter case, a position which is not set is calculated based on a position which is set. This method is defined in the interface control system 2000 in advance. For example, in a case where the coordinate system 80 is defined as illustrated in FIG. 11, a y-coordinate and a z-coordinate of a position of the operation image 60 are not changed regardless of whether the first marker 50 is located on the left arm portion or the right arm portion. Regarding an x-coordinate, 3Mx representing a size of the operation image 60 in the x direction is taken into consideration in a case where the first marker is located on the left arm portion, whereas doing this is not necessary in a case where the first marker is located on the right arm portion. A sign of the x-coordinate is positive. Therefore, the display control unit 2040 calculates a position of the operation image 60 in a case where the first marker 50 is located on the right arm portion as (3Mx, −Iy/2, 0) based on a position of the operation image 60 in a case where the first marker 50 is located on the left arm portion.

<<Drawing of Operation Image 60 on Display Screen 32>>

The above-described posture, size, and position of the operation image 60 are a posture, a size, and a position of the operation image 60 in the three-dimensional coordinate system 80 defined based on the first marker 50 captured in a captured image. However, actually, the display control unit 2040 draws the operation image 60 on the display screen 32 which is a two-dimensional plane. Therefore, the display control unit 2040 performs a process of mapping the operation image 60 in the three-dimensional coordinate system 80 onto the two-dimensional plane of the display screen 32, and displays the mapped operation image 60 on the display screen 32. Consequently, the user viewing the display screen 32 can view the operation image 60 superimposed on the arm portion of the user in the above-described posture and the like.

Here, if an imaging direction of the camera 20 is able to be considered to match a visual line direction of the user, a two-dimensional plane of the display screen 32 is the same as a two-dimensional plane of a captured image. Therefore, the display control unit 2040 can map the operation image 60 onto the two-dimensional plane of the display screen 32 by mapping the operation image 60 onto the two-dimensional plane of the captured image. Note that a known method may be used as a method of mapping an object present with a predetermined posture, size and posture in a three-dimensional space onto a two-dimensional space having a defined relationship with the three-dimensional space. Thus, a detailed description of the method will not be repeated.

However, the display control unit 2040 may perform the mapping by taking into consideration such a difference between directions without considering that an imaging direction of the camera 20 matches a visual line direction of the user. In this case, the display control unit 2040 performs the mapping by using a parameter indicating a correspondence relationship between an imaging direction of the camera 20 and a visual line direction of the user. The parameter may be set in the display control unit 2040 in advance, or may be stored in a storage device which can be accessed by the display control unit 2040.

<Type of Operation Image 60>

Figure 12:
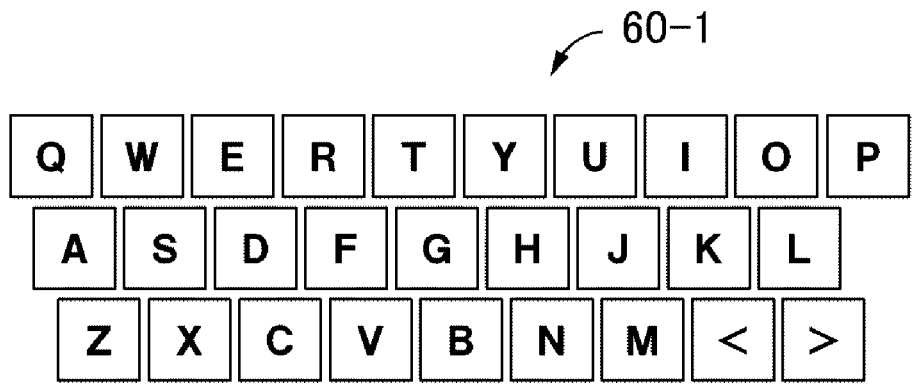
FIG. 12 is a diagram illustrating examples of operation images.
Figure 12:
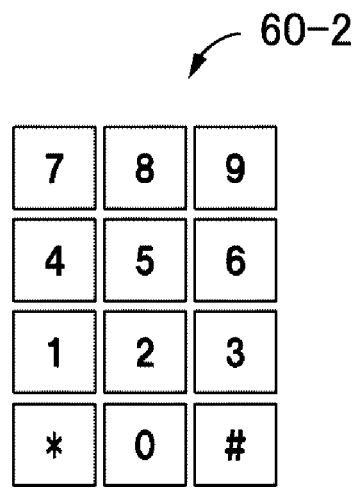
Figure 12:

Various images may be used as the operation image 60 used for an input operation performed by the user. FIG. 12 is a diagram illustrating examples of the operation images 60. An operation image 60-1 is a keyboard image. An operation image 60-2 is a telephone type ten key image. An operation image 60-3 is an image describing buttons for selecting two options such as YES and NO. The operation image 60 handled by the interface control system 2000 may be of only one type, or may be of a plurality of types.

In a case where the interface control system 2000 handles a plurality of types of operation images 60, the display control unit 2040 determines the type of operation image 60 to be displayed on the display screen 32 among the plurality of types of operation images 60. For example, the display control unit 2040 determines the type of operation image 60 in response to the user's operation. Here, the user's operation includes various operations. For example, the user specifies or changes the type of operation image 60 by operating a button or the like provided on the head mounted display 30. For example, the user may change the type of operation image 60 by applying a predetermined operation to the operation image 60 which is currently displayed on the display screen 32. This predetermined operation is, for example, an operation of pressing a specific key included in the operation image 60.

In a case where the interface control system 2000 handles a plurality of types of first markers 50, the type of first marker 50 captured in a captured image may be associated with the type of operation image 60 displayed on the display screen 32 in advance. In this case, the display control unit 2040 determines the type of operation image 60 by determining the type of first marker 50 captured in a captured image. In this case, for example, the type of first marker 50 is defined by a shape, a pattern, and a color of the marker. For example, in a case where the type of operation image 60 is defined according to a color of the first marker 50, the display control unit 2040 displays the operation image 60 corresponding to a color captured in a captured image on the display screen 32.

In a case where an identifier (ID) can be calculated from the first marker 50, the ID may be associated with the type of operation image 60 in advance. The first marker 50 from which an ID can be calculated is, for example, a QR code (registered trademark). In this case, the display control unit 2040 calculates an ID by analyzing the first marker 50 captured in a captured image, and displays the operation image 60 associated with the ID on the display screen 32.

Figure 13:
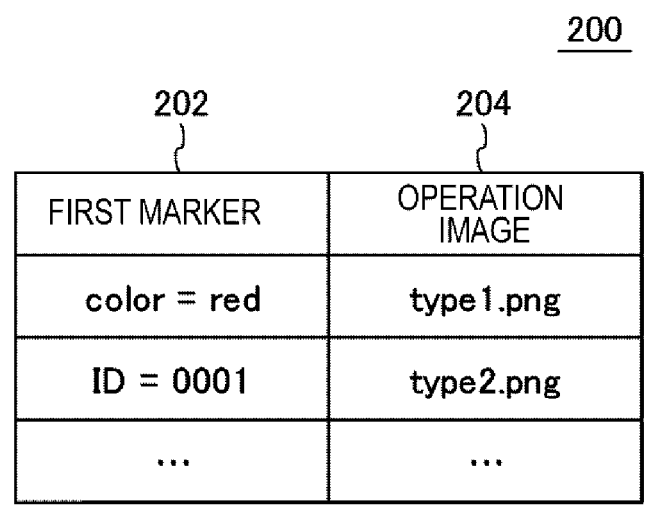
FIG. 13 is a diagram illustrating information indicating a correspondence relationship between the first marker and an operation image in a table form.

FIG. 13 is a diagram illustrating information indicating a correspondence relationship between the first marker 50 and the operation image 60 in a table form. A table in FIG. 13 will be referred to as a correspondence table 200. A first marker 202 indicates the type, an ID, and the like of the first marker 50. An operation image 204 indicates the operation image 60 corresponding to the first marker 50 indicated by the first marker 202.

Note that the information (the correspondence table 200 or the like) indicating a correspondence relationship between the first marker 50 and the operation image 60 may be set in the display control unit 2040 in advance, or may be stored in a storage device which can be accessed by the display control unit 2040.

<Method of Changing First Marker 50>

As described above, there may be a plurality of types of first markers 50. In this case, the second display control unit 2060 has a function of changing the first marker 50 displayed on the display screen 72. For example, the second display control unit 2060 changes the first marker 50 in response to an operation on the device 70. An operation on the device 70 is an operation on, for example, a physical button provided on the device 70. In a case where the display screen 72 is a touch panel, an operation on the device 70 may be a tap operation or a swipe operation on the display screen 72.

For example, the second display control unit 2060 changes the first marker 50 in response to an operation on the head mounted display 30. In this case, the device 70 performs communication with the head mounted display 30 so as to acquire an instruction for changing the first marker 50. Information acquired from the head mounted display 30 is any information capable of determining the first marker 50 to be displayed. For example, the information is an ID for determining the first marker 50 to be displayed, or an image of the first marker 50.

<Detection of Operation Performed by User>

The interface control system 2000 detects that the operation image 60 has been operated by the user, so as to receive an input operation performed by the user. For example, in a case where the user applies an operation to a T key in the operation image 60 describing a keyboard, the interface control system 2000 detects that the operation has been applied to the T key. Here, any method of the interface control system 2000 detecting an operation on the operation image 60 performed by the user may be used. Specific examples of this method will be described in example embodiments which will be described later.

<Target Controlled Due to Operation on Operation Image 60>

The user controls various computers by performing an operation on the operation image 60. For example, the user performs an operation on the operation image 60 so as to operate an application, an operating system (OS), or the like (hereinafter, referred to as an application or the like) operating in the head mounted display 30. For example, the user performs an operation on the operation image 60 so as to control an application or the like operating in the device 70. For example, the user may perform an operation on the operation image 60 so as to operate an application or the like operating in a PC or a smart phone. The user may perform an operation on the operation image 60 so as to control various machines provided in a facility such as a factory. Note that a computer to be controlled may be the computer 1000 (refer to FIG. 7) implementing the interface control system 2000, or may be other computers. In the latter case, various computers to be controlled are communicably connected to the computer 1000. For example, such various computers are connected to the computer 1000 through the input/output interface 1100.

<Operation on Device 70 Using Operation Image 60>

As described above, the user may perform an operation on the operation image 60 so as to control the application or the like operating in the device 70. In this case, the user may perform an operation on the operation image 60 so as to change the first marker 50 displayed on the display screen 72.

Here, a region (for example, the arm portion of the user) in which the operation image 60 is displayed is wider than an operation region (a region in which the display screen 72 or a hardware button is disposed.) of the device 70. Thus, the user can operate the device 70 in a wider operation region by enabling the device 70 to be operated by using the operation image 60. Therefore, the operability of the device 70 for the user is improved.

Example Embodiment 2

Figure 14:
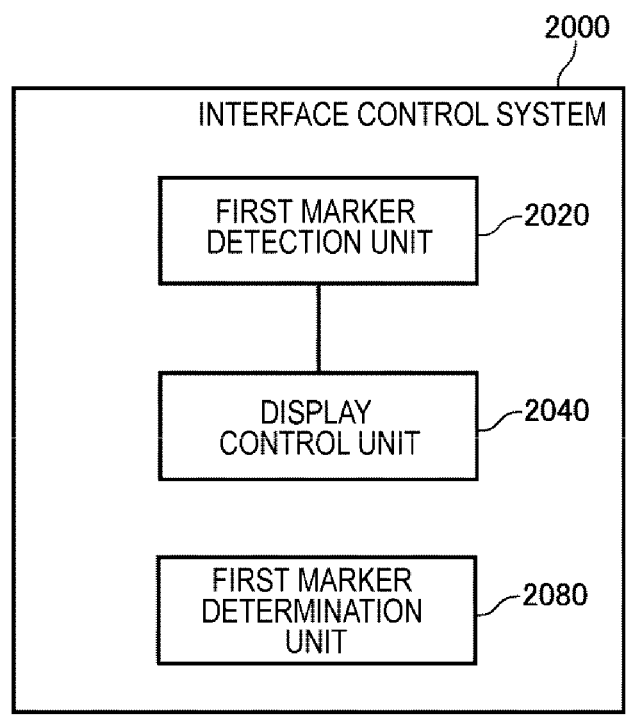
FIG. 14 is a block diagram illustrating an interface control system according to Example Embodiment 2.

FIG. 14 is a block diagram illustrating an interface control system 2000 according to Example Embodiment 2. In FIG. 14, each block indicates not a configuration in the hardware unit but a configuration in the functional unit. The interface control system 2000 of Example Embodiment 2 has the same function as that of the interface control system 2000 of Example Embodiment 1 except for the following description.

The interface control system. 2000 of Example Embodiment 2 includes a first marker determination unit 2080. The first marker determination unit 2080 determines a shape, a pattern, or a color (hereinafter, referred to as a shape or the like) of the first marker 50 displayed on the display screen 72 of the device 70. For this reason, the first marker determination unit 2080 extracts a feature of the background in an image obtained from the camera 20. The first marker determination unit 2080 determines a shape or the like of the first marker 50 to be displayed on the display screen 72 based on the extracted feature of the background. Note that a shape of the first marker 50 means an outer shape of the first marker 50, and a pattern of the first marker 50 means an inner pattern of the first marker 50.

As described above, the first marker detection unit 2020 detects the first marker 50 captured in a captured image obtained from the camera 20. Here, if the feature of the background in the captured image is similar to a feature of the first marker 50, the first marker 50 captured in the captured image is hardly detected compared with a case where the features are not similar to each other. For example, the first marker detection unit 2020 cannot detect the first marker 50 captured in a captured image, and the display control unit 2040 cannot accurately calculate a posture or the like of the first marker 50. As a result, there is a probability that the operation image 60 may not be displayed at a timing at which the operation image is to be displayed, and the operation image 60 may be displayed at an unnatural position or in an unnatural posture. A method may be used in which the first marker detection unit 2020 or the display control unit 2040 analyzes a captured image more in detail in order to prevent such a situation, but a lot of computation time or computer resources are required to detect the first marker 50.

Therefore, the first marker determination unit 2080 of the present example embodiment analyzes a feature of the background in a captured image obtained from the camera 20, and determines a shape or the like of the first marker 50 according to the feature. Consequently, there is an advantage that the first marker 50 captured in the captured image is easily detected.

Hereinafter, details of an operation of the first marker determination unit 2080 will be described.

<Method of Determining Color of First Marker>

The first marker determination unit 2080 calculates a feature of a color of the background in a captured image. The first marker determination unit 2080 determines a color of the first marker 50 according to the feature of the color of the background in the captured image. For example, the feature of the color of the background is defined by a color distribution of the background. The first marker determination unit 2080 calculates a color region which is not used for the color of the background by using the color distribution of the background. The first marker determination unit 2080 determines a color of the first marker 50 by using a color included in the color region which is not used.

<Method of Determining Shape and Pattern of First Marker 50>

The first marker determination unit 2080 calculates a feature of a pattern of the background in a captured image. The first marker determination unit 2080 determines a shape or a pattern of the first marker 50 according to the feature of the pattern. For example, in a case where the pattern of the background in the captured image includes a lot of straight lines, the first marker determination unit 2080 sets the shape of the first marker 50 as a shape (a circular shape) formed of a curve, or sets the pattern of the first marker 50 as a pattern (polka-dot pattern) including a lot of curves. On the other hand, in a case where the pattern of the background in the captured image includes a lot of curves, the first marker determination unit 2080 sets the shape of the first marker 50 as a shape (a rectangular shape) formed of a straight line, or sets the pattern of the first marker 50 as a pattern (lattice pattern) including a lot of straight lines.

<Image Region Used to Calculate Feature>

A region used to calculate a feature of the background in a captured image may be the entirety of the captured image, or may be a partial region of the captured image. In the latter case, for example, a region to be used is a predetermined range including a display location (for example, the display screen 72 of the device 70) of the first marker 50. The predetermined range including a display location of the first marker 50 is, for example, a region described as a circle that has a radius of a predetermined length and the center of which is at the center of the display location of the first marker 50. The predetermined length may be defined by an absolute value not depending on a size of the display location of the first marker 50, or may be defined by a relative value to a size of the display location of the first marker 50. Information indicating the display location of the first marker 50 or the predetermined length may be set in the first marker determination unit 2080 in advance, or may be stored in a storage device which can be accessed by the first marker determination unit 2080. Note that a shape of the predetermined range is not limited to a circular shape.

<Method Using Determined Feature of First Marker 50>

The first marker determination unit 2080 generates or acquires the first marker 50 based on the determined feature. In the former case, a known technique may be used as a technique of generating an image having a predetermined color, shape, and pattern. Thus, a detailed description of a method of generating the first marker 50 will not be repeated. The second display control unit 2060 displays the first marker 50 generated by the first marker determination unit 2080 on the display screen 72.

In a case where the first marker 50 is acquired based on the determined feature, the first marker determination unit 2080 selects the first marker 50 matching the determined feature from among a plurality of prepared first markers 50. In this case, each first marker 50 is stored in a storage device in association with information indicating features of a color, a shape, and a pattern of the first marker 50 in advance. FIG. 15 is a diagram illustrating information regarding the first marker 50 in a table form. A table in FIG. 15 will be referred to as first marker information 300. The first marker information 300 includes an ID 302, a color feature 304, a shape feature 306, and a pattern feature 308. Here, the ID 302 indicates an ID of the first marker 50. The first marker determination unit 2080 selects the first marker 50 having a feature which is determined based on a feature of the background in a captured image from among the first markers 50 shown in the first marker information 300. The second display control unit 2060 displays the first marker 50 selected by the first marker determination unit 2080 on the display screen 72.

Example Embodiment 3

An interface control system 2000 according to Example Embodiment 3 is illustrated in FIG. 1 in the same manner as, for example, in Example Embodiment 1. The interface control system 2000 of Example Embodiment 3 is the same as the interface control system 2000 of Example Embodiment 1 or 2 except for the following description.

The display control unit 2040 of Example Embodiment 3 displays a second marker on the display screen 32 of the head mounted display 30. The display control unit 2040 displays an operation image in a case where the first marker and the second marker have a predetermined positional relationship in a view of a user.

Figure 16:
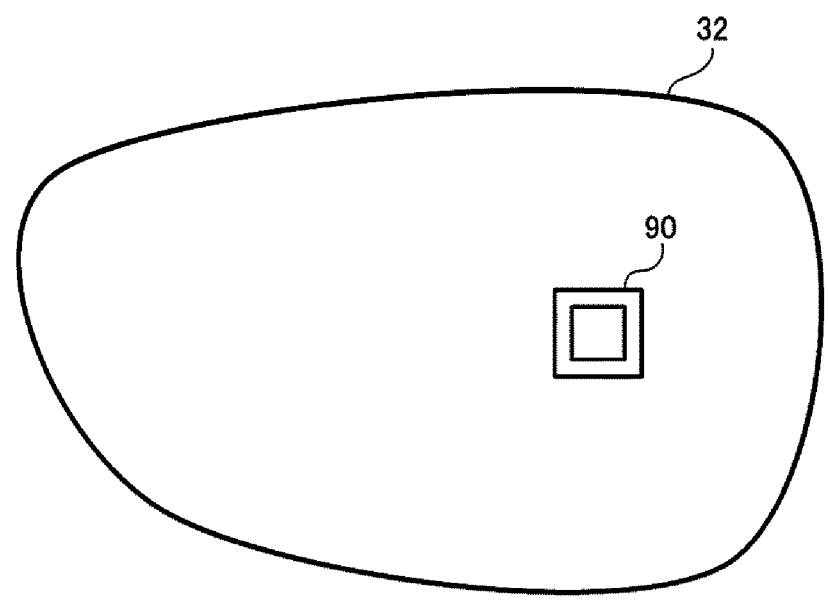
FIG. 16 is a diagram illustrating a second marker displayed on a display screen.

FIG. 16 is a diagram illustrating a second marker 90 displayed on the display screen 32. Here, a shape or the like of the second marker 90 is any shape or the like. The second marker 90 may be a marker having the same shape as that of the first marker 50, or may be a marker differing in a shape.

Figure 17A:
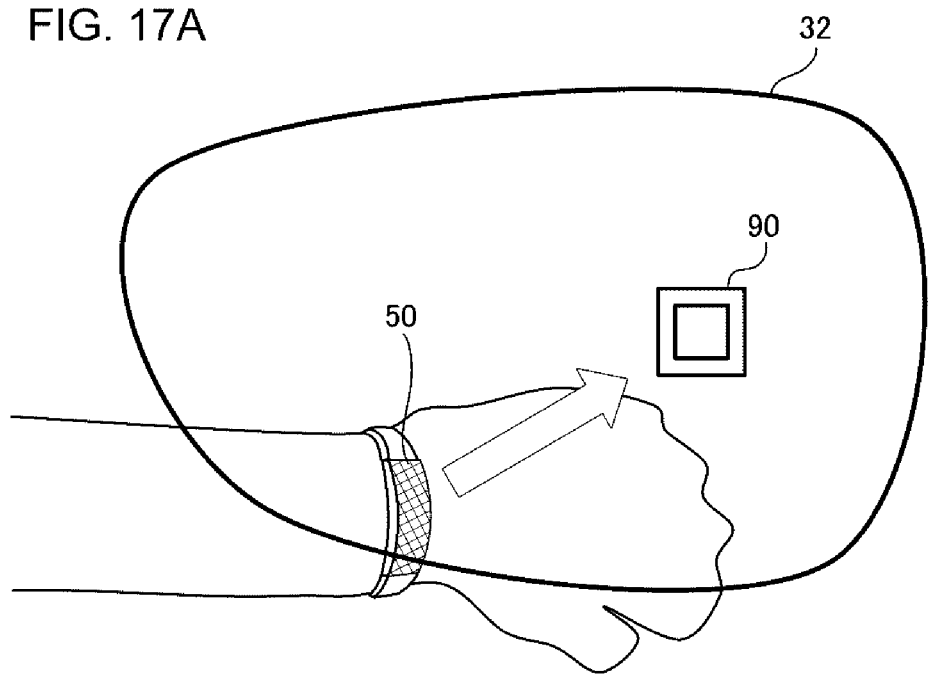
FIGS. 17A and 17B are diagrams illustrating a scene in which an operation image is displayed in a case where the first marker and the second marker overlap each other in a view of a user.
Figure 17B:
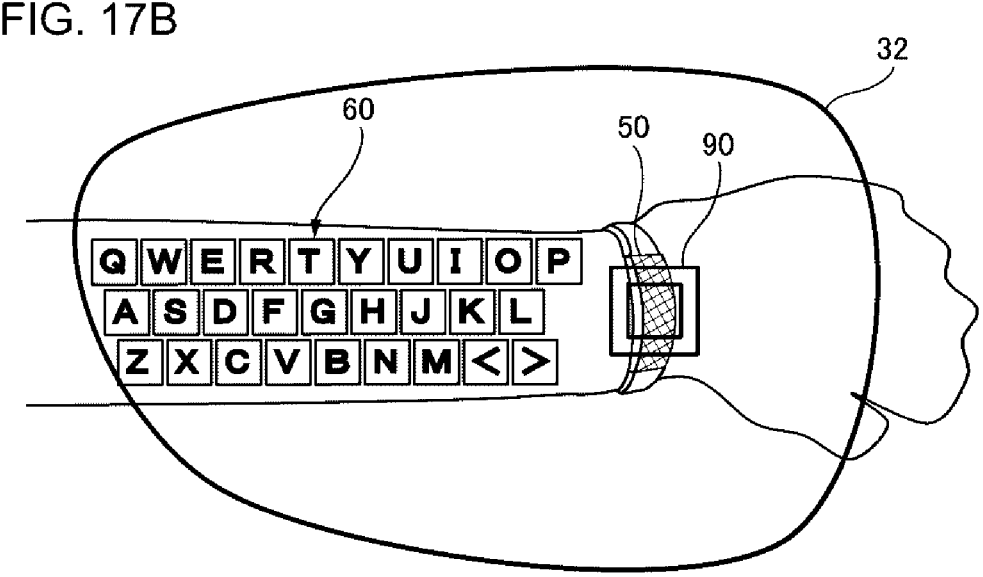

The predetermined positional relationship may be any positional relationship. For example, this positional relationship is a positional relationship that "the first marker 50 and the second marker 90 are viewed while overlapping each other", or a positional relationship that "a distance between the first marker 50 and the second marker 90 is equal to or less than a predetermined distance". FIGS. 17A and 17B are diagrams illustrating a scene in which the operation image 60 is displayed in a case where the first marker 50 and the second marker 90 overlap each other in a view of the user. In FIG. 17A, the first marker 50 does not overlap the second marker 90, and thus the operation image 60 is not displayed. On the other hand, in FIG. 17B, the first marker 50 and the second marker 90 overlap each other as a result of the user moving the arm portion, and thus the operation image 60 is displayed.

Hereinafter, a detailed description will be made of a process performed by the interface control system 2000 of the present example embodiment.

<Specific Method 1>

The display control unit 2040 can recognize a positional relationship between the first marker 50 and the second marker 90 in a view of the user based on a position of the first marker 50 in a captured image, a position of the second marker 90 in the display screen 32, and a correspondence relationship (a conversion equation or the like for converting the coordinates on the display screen 32 into the coordinates on the captured image) between coordinates on the captured image and coordinates on the display screen 32. For example, the display control unit 2040 converts a position of the second marker 90 on the display screen 32 into a position on the captured image by using the correspondence relationship between the coordinates on the captured image and the coordinates on the display screen 32 (maps the second marker 90 onto the captured image). The display control unit 2040 determines whether or not the positional relationship is a predetermined positional relationship by using the position of the first marker 50 and the position of the second marker 90 in the captured image.

Note that a correspondence relationship between the coordinates on the captured image and the coordinates on the display screen 32 is defined based on various parameters (an angle of view or a focal length) regarding the camera 20, a positional relationship between the display screen 32 and the camera 20, or the like. This correspondence relationship may be calculated by the display control unit 2040 by using such parameters, or may be defined as a setting value in advance.

For example, the display control unit 2040 displays the operation image 60 in a case where the second marker 90 mapped onto the captured image overlaps the first marker 50. On the other hand, in a case where the markers do not overlap each other, the display control unit 2040 does not display the operation image 60. For example, the display control unit 2040 calculates a distance between the second marker 90 mapped onto the captured image and the first marker 50. The display control unit 2040 displays the operation image 60 in a case where the distance is equal to or less than a predetermined value, and does not display the operation image 60 in a case where the distance is more than the predetermined value. The predetermined distance may be set in the display control unit 2040 in advance, or may be stored in a storage device which can be accessed by the display control unit 2040.

Figure 18:
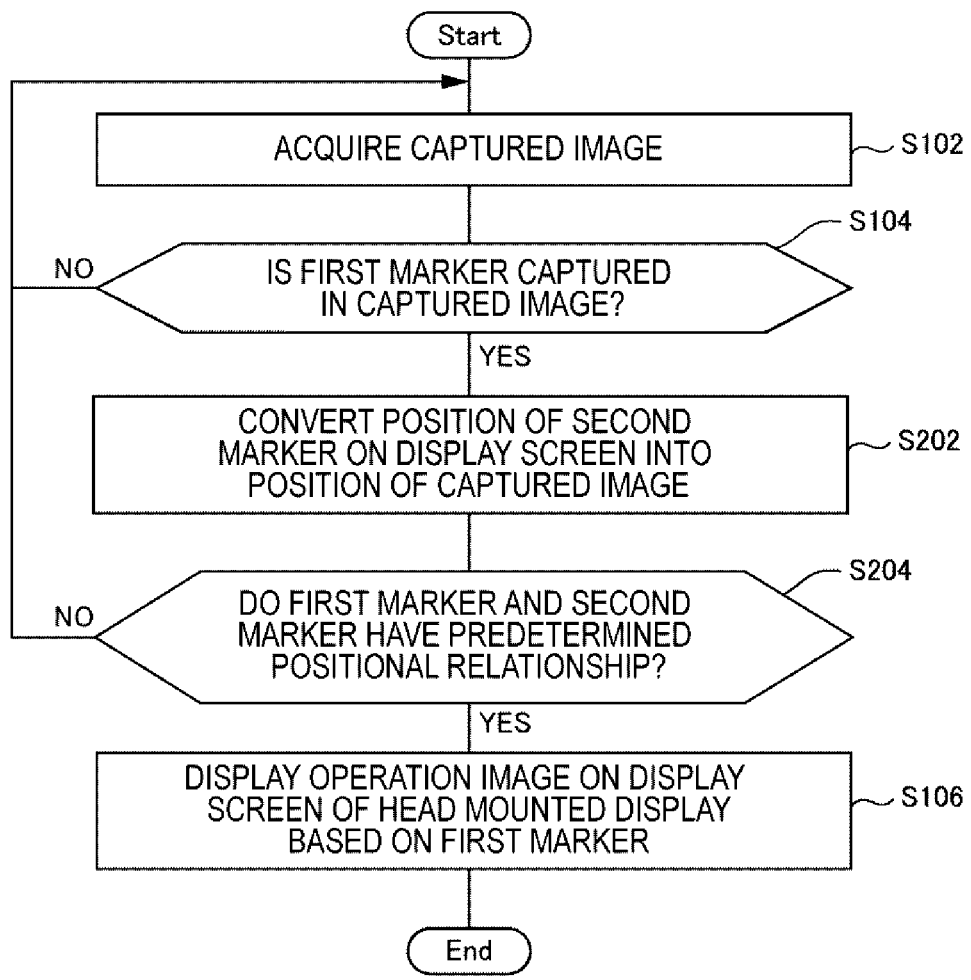
FIG. 18 is a flowchart illustrating a flow of a process performed by the interface control system of Example Embodiment 2 according to a method 1.

FIG. 18 is a flowchart illustrating a flow of a process performed by the interface control system 2000 of Example Embodiment 2 according to the above-described method 1. Each step in FIG. 18 having the same step number as that in FIG. 8 represents the same process as in the step having the same step number.

After the first marker 50 is detected from the captured image (S104: YES), the display control unit 2040 converts a position of the second marker 90 on the display screen 32 into a position on the captured image (S202). The display control unit 2040 determines whether or not a position of the first marker 50 and a position of the second marker 90 in the captured image have a predetermined positional relationship (S204). In a case where the positions have the predetermined positional relationship (S204: YES), the process in FIG. 18 proceeds to S106. On the other hand, in a case where the positions have the predetermined positional relationship (S204: NO), the process in FIG. 18 proceeds to S102.

Note that the display control unit 2040 may recognize a positional relationship between a position of the first marker 50 and a position of the second marker 90 by converting the position of the first marker 50 into a position on a coordinate space of the display screen 32.

<Specific Method 2>

The interface control system 2000 may restrict a range in which the first marker detection unit 2020 detects the first marker 50 from a captured image to a predetermined range with the second marker 90 as a reference, so that the operation image 60 is displayed only in a case where the first marker 50 and the second marker 90 have a predetermined positional relationship. Specifically, first, the first marker detection unit 2020 converts a position of the second marker 90 into a position on a captured image before detecting whether or not the first marker 50 is captured in the captured image. The first marker detection unit 2020 detects the first marker 50 with respect to only a predetermined range with a position of the second marker 90 as a reference among regions included in the captured image. Consequently, the first marker 50 is detected only in a case where the second marker 90 and the first marker 50 have a predetermined positional relationship. In this case, the display control unit 2040 displays the operation image 60 in a case where the first marker 50 is detected by the first marker detection unit 2020.

Figure 19:
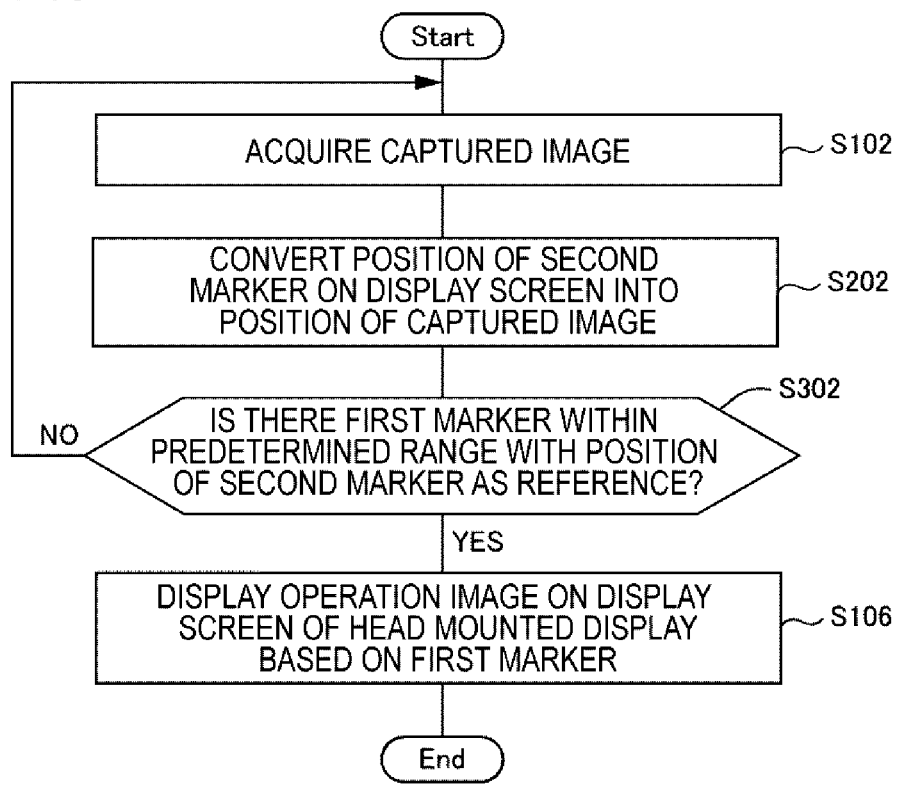
FIG. 19 is a flowchart illustrating a flow of a process performed by the interface control system of Example Embodiment 2 according to a method 2.

FIG. 19 is a flowchart illustrating a flow of a process performed by the interface control system 2000 of Example Embodiment 2 according to the above-described method 2. Each step in FIG. 19 having the same step number as that in FIG. 18 represents the same process as in the step having the same step number. After the captured image is acquired (S102), the display control unit 2040 converts a position of the second marker 90 on the display screen 32 into a position on the captured image (S202). The first marker detection unit 2020 detects the first marker 50 within a predetermined range with a position of the second marker 90 in the captured image as a reference (S302). In a case where the first marker 50 is detected within the predetermined range (S302: YES), the process in FIG. 19 proceeds to S106. On the other hand, in a case where the first marker 50 is not detected within the predetermined range (S302: NO), the process in FIG. 19 proceeds to S102.

Modification Examples

The display control unit 2040 may display a plurality of second markers 90 at different positions on the display screen 32. In this case, if the first marker 50 and a certain second marker 90 have a predetermined positional relationship, the display control unit 2040 may display the operation image 60 corresponding to the second marker 90. For example, the display control unit 2040 displays the operation image 60 describing a keyboard in a case where the first marker 50 and a second marker 90-1 have a predetermined positional relationship, and displays the operation image 60 describing ten keys in a case where the first marker 50 and a second marker 90-2 have a predetermined positional relationship. Consequently, the user can easily use a plurality of types of operation images 60. Note that a correspondence relationship between the second marker 90 and the operation image 60 may be set in the display control unit 2040 in advance, or may be stored in a storage device which can be accessed by the display control unit 2040. In this case, if the name or an abbreviation of the operation image 60 corresponding to the second marker 90 is included in the second marker 90, the user can easily recognize a correspondence relationship between the second marker 90 and the operation image 60.

<Hardware Configuration Example>

For example, a hardware configuration of the interface control system 2000 of Example Embodiment 2 is illustrated in FIG. 7 in the same manner as in the interface control system 2000 of Example Embodiment 1. In the present example embodiment, each program module stored in the above-described storage 1080 further includes a program for realizing each function described in the present example embodiment.

Advantageous Effects

According to the interface control system 2000 of the present example embodiment, the second marker 90 is displayed on the display screen 32, and the operation image 60 is displayed in a case where the first marker 50 and the second marker 90 have a predetermined positional relationship in a view of a user. Therefore, compared with an embodiment in which the operation image 60 is constantly displayed in a case where the first marker 50 is included in a view of a user, the user can easily perform work other than an operation on the operation image 60 even in a situation in which the first marker 50 is included in the view.

Example Embodiment 4

Figure 20:
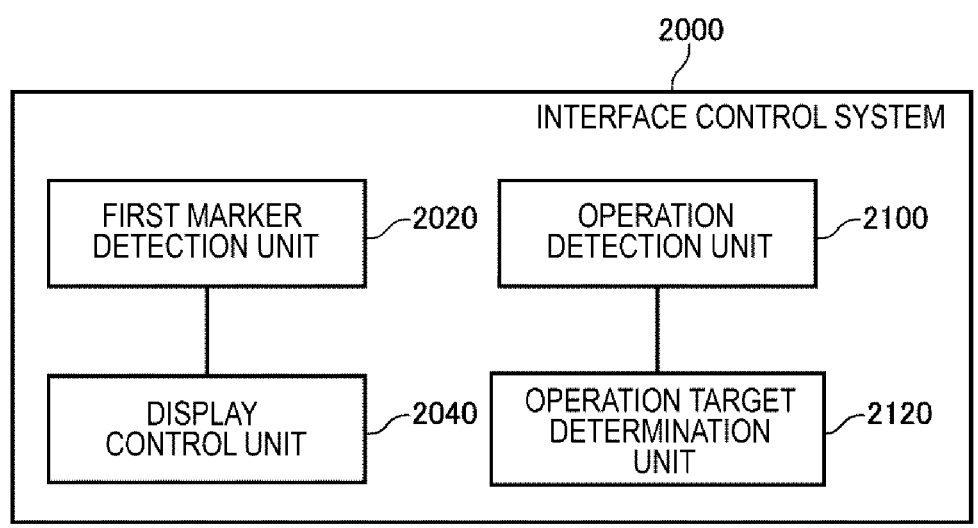
FIG. 20 is a block diagram illustrating an interface control system according to Example Embodiment 4.

FIG. 20 is a block diagram illustrating an interface control system 2000 according to Example Embodiment 4. In FIG. 20, each block indicates not a configuration in the hardware unit but a configuration in the functional unit. The interface control system 2000 of Example Embodiment 4 has the same function as that of the interface control system 2000 of any one of Example Embodiments 1 to 3 except for the following description.

The interface control system 2000 of Example Embodiment 4 includes an operation detection unit 2100 and an operation target determination unit 2120. The operation detection unit 2100 detects an operation on an operation image performed by a user. The operation target determination unit 2120 determines "which operation target has been operated by the user" in a case where a plurality of operation targets are included in an operation image. The operation image including a plurality of operation targets is, for example, a keyboard image. In this case, an operation target is an image indicating each key.

<Details of Process Performed by Operation Detection Unit 2100>

<<Detection Method 1>>

The operation detection unit 2100 detects that an operation has been performed on an operation image in a case where an operation body is disposed at a position superimposed on the operation image in a view of a user. Here, the operation body indicates any object used to operate the operation image. The operation body may be a part of the user's body (for example, the finger or the like), or may be objects (for example, a pen) other than the user's body.

The operation detection unit 2100 determines whether or not the operation body is captured in a region on which the operation image 60 is superimposed in a view of the user by analyzing a captured image obtained from the camera 20. In a case where the operation body is captured in the region, the operation detection unit 2100 determines that the operation image 60 has been operated. Here, the operation detection unit 2100 determines whether or not the operation body is captured in the region on which the operation image 60 is superimposed in the view of the user based on a positional relationship between the operation body and the operation image 60 on the captured image. Specifically, in a case where a region of the operation body on the captured image overlaps a region of the operation image 60 on the captured image, the operation detection unit 2100 determines that the operation body is captured in the region on which the operation image 60 is superimposed in the view of the user.

Here, actually, the operation image 60 is not captured in the captured image. Therefore, the operation detection unit 2100 performs a process of mapping the operation image 60 in the three-dimensional coordinate system 80 calculated within a display process of the operation image 60 in the display control unit 2040 onto a two-dimensional plane of the captured image, so as to calculate a region of the operation image 60 on the captured image.

Note that the operation detection unit 2100 may handle any object other than the arm portion of the user on which the operation image 60 is displayed, as an operation body, or may handle only a predetermined object as an operation body. In the latter case, the operation detection unit 2100 determines that the operation image 60 has been operated in a case where, among regions included in the captured image, any object other than the arm portion of the user is captured in the region on which the operation image 60 is superimposed in the view of the user. On the other hand, in the latter case, the operation detection unit 2100 determines whether or not a predetermined operation body is captured in the region. In a case where the predetermined operation body is captured in the region, the operation detection unit 2100 determines that the operation image 60 has been operated. Note that a known object recognition technique or the like may be used as a technique of detecting that a predetermined object (a predetermined shape or the like) is captured in a predetermined region in an image. Thus, a detailed description of this method will not be repeated.

Figure 21:
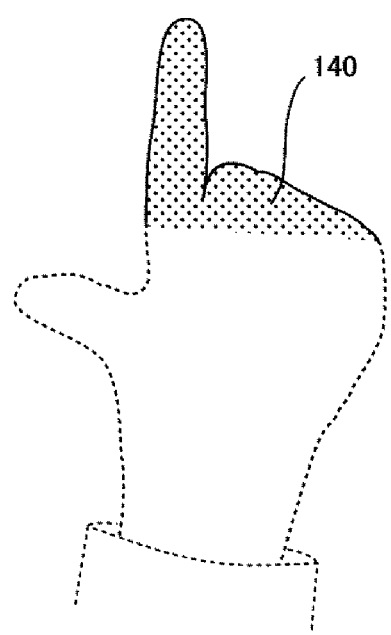
FIG. 21 is a diagram illustrating a shape formed of the finger and a part of the back of the hand which are detection targets.

Here, in a case where the user's finger is an operation body, the operation detection unit 2100 may set, as a detection target, not only a shape of the fingertip but also a shape formed of the finger and a part of the back of the hand. FIG. 21 is a diagram illustrating a shape formed of the finger and a part of the back of the hand which are detection targets. In FIG. 21, a dotted portion is a shape which is a detection target.

A shape formed of the finger and a part of the back of the hand differs in cases of the right hand and the left hand. It can be seen that the hand used by the user as an operation body is the left hand in a case where the operation image 60 is displayed on the right arm portion, and is the right hand in a case where the operation image 60 is displayed on the left arm portion. Therefore, the operation detection unit 2100 determines a shape of an operation body to be detected based on whether it is the left arm portion or the right one on which the operation image 60 is displayed. For example, in a case where the operation image 60 is displayed on the left arm portion, the operation detection unit 2100 sets a shape of the finger of the right hand and a part of the back of the hand as a shape of an operation body to be detected. According to this method, there is no situation in which an opposite hand to the hand used for an operation on the operation image 60 is wrongly detected as an operation body, and thus it is possible to reduce erroneous detection of an operation body.

Here, the operation detection unit 2100 may determine that the operation image 60 has been operated only in a case where an operation body is continuously captured for a predetermined time or more in a region on which the operation image 60 is superimposed in the view of the user. In the above-described way, it is possible to prevent the operation detection unit 2100 from detecting that "the operation image 60 has been operated", for example, in a case where an operation body has only passed over the operation image 60.

In a case of the present method, there is an advantage that a sensor detecting vibration is not necessary compared with detection methods 2 and 3 which will be described later.

<<Detection Method 2>>

The operation detection unit 2100 may detect that the operation image 60 has been operated in a case where vibration is applied to the arm portion of the user. In this case, a sensor (for example, an acceleration sensor) detecting vibration is attached to the arm portion of the user. For example, in a case where impact of predetermined magnitude or more is measured by the sensor, the operation detection unit 2100 detects that the operation image 60 has been operated. The predetermined magnitude may be set in the operation detection unit 2100 in advance, or may be stored in a storage device which can be accessed by the operation detection unit 2100.

Here, an operation applied to the operation image 60 by the user is, for example, an operation of tapping the operation image 60. Therefore, in a case where vibration is applied to the arm portion due to tapping, the operation detection unit 2100 may determine that the operation image 60 has been operated. In this case, the operation detection unit 2100 analyzes outputs from the sensor, and determines that the operation image 60 has been operated in a case where an output indicating vibration caused by tapping is detected. For example, in a case where a high frequency component of a predetermined frequency or higher is included in an output from the sensor, the operation detection unit 2100 determines that the arm portion has been tapped. This predetermined frequency may be set in the operation detection unit 2100 in advance, or may be stored in a storage device which can be accessed by the operation detection unit 2100.

The above-described sensor detecting vibration is provided in, for example, the device 70. In this case, for example, the operation detection unit 2100 is provided in the device 70. In a case where the operation detection unit 2100 detects that the operation image 60 has been operated, the device 70 notifies the head mounted display 30 of the fact. However, the operation detection unit 2100 may be provided outside the device 70. In this case, the operation detection unit 2100 performs communication with the device 70 so as to acquire information indicating an output from the sensor. The sensor may be provided outside the device 70.

The sensor may be provided to be in close contact with the user's bare skin, or may be provided not to be in close contact therewith. For example, in a case where the sensor is provided in the device 70, and the device 70 is attached to the arm portion of the user through clothes, the sensor is provided not to be in close contact with the user's bare skin.

According to this method, since the user operates the operation image 60 by applying vibration to the arm portion, there is an advantage that the user can obtain feedback with an actual feeling through a sense of touch when the user performs an operation. There is an advantage that the user can instinctively recognize and check a position at which an operation has been performed, through the sense of touch. In addition, the fact that the user just holds the hand over the operation image 60 does not cause the operation image 60 to be operated, and the operation image 60 is not operated unless the user intentionally taps the arm portion. Therefore, there is also an advantage that a probability that an input unintended by the user is wrongly detected is reduced.

<<Detection Method 3>>

Figure 22:
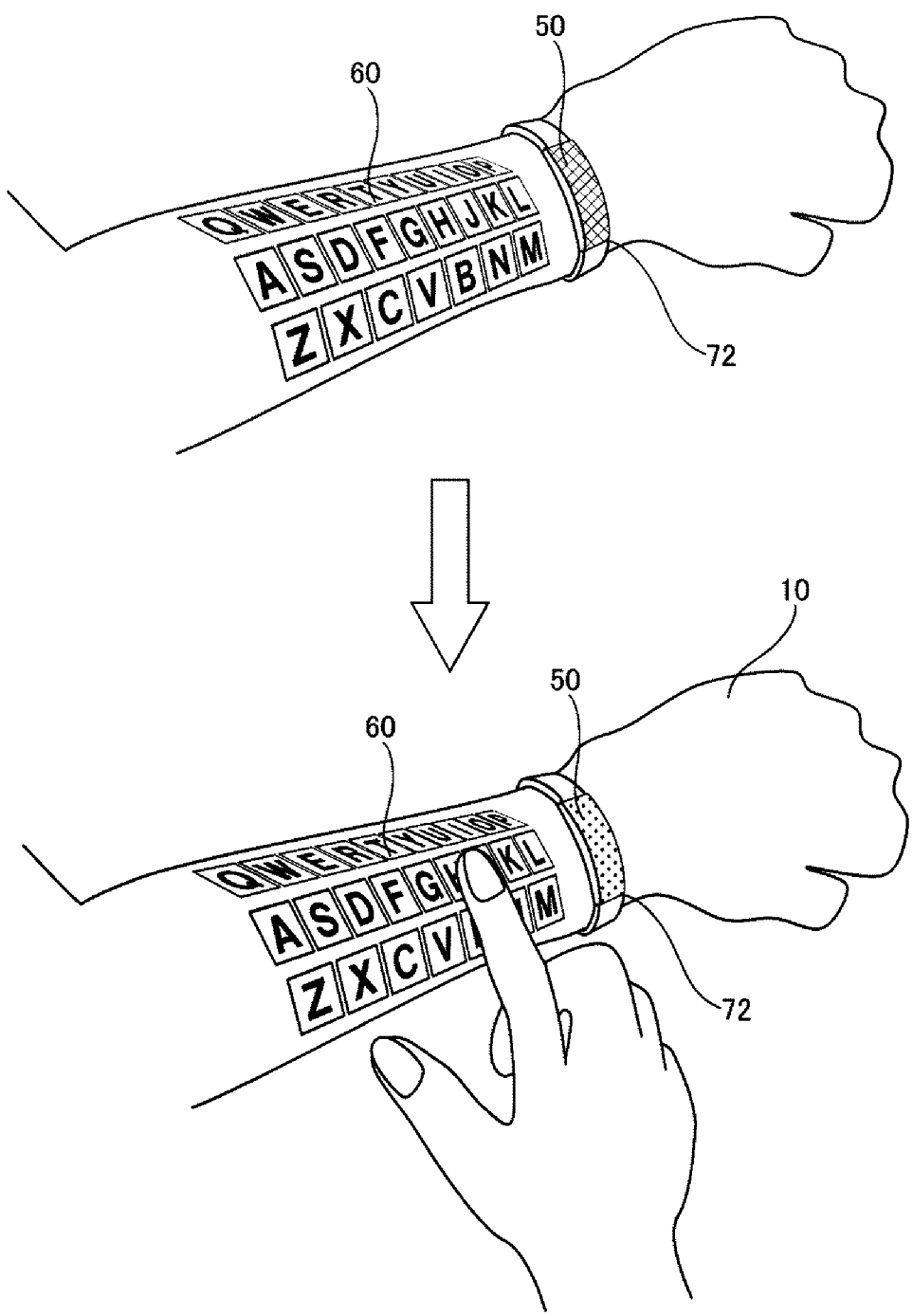
FIG. 22 is a diagram illustrating a scene in which a first marker is changed when an operation image is tapped.

In a detection method 3, the operation detection unit 2100 detects that predetermined vibration has been applied to the arm portion of the user in the same manner as in the detection method 2. In a case where it is detected that the predetermined vibration has been applied to the arm portion of the user, the second display control unit 2060 changes the first marker 50 which is currently displayed on the display screen 72. Next, the operation detection unit 2100 determines whether or not the first marker 50 has been changed by analyzing a captured image obtained from the camera 20. In a case where the first marker 50 has been changed, the operation detection unit 2100 determines that the operation image 60 has been operated. FIG. 22 is a diagram illustrating a scene in which the first marker 50 is changed in a case where the operation image 60 is tapped.

For example, two types of images such as an image during normal times and an image during operation detection are prepared as images of the first marker 50. In a case where it is detected that vibration has been applied to the arm portion of the user, the second display control unit 2060 changes an image of the first marker 50 from the image during normal times to the image during operation detection.

Here, the second display control unit 2060 may change the whole of the first marker 50, or may change only a part of the first marker 50. In the latter case, for example, the first marker 50 is formed of two portions such as a first portion used for display of the operation image 60 and a second portion used to detect that the operation image 60 has been operated. In a case where the predetermined vibration has been applied to the arm portion of the user, the second display control unit 2060 changes the second portion of the first marker 50.

The present method has an advantage that it is not necessary to perform communication for transmitting the fact that vibration has been detected by a sensor to the head mounted display 30, in addition to the same advantage as in the detection method 2. Thus, the head mounted display 30 or the device 70 is not required to have a communication function.

Note that the sensor used in the above-described detection method 2 or detection method 3 is not limited to a vibration sensor. For example, the sensor may be a pressure sensor or a capacitance sensor. The pressure sensor or the capacitance sensor may be provided at any location. For example, the pressure sensor or the capacitance sensor is provided on the display screen 72 of the device 70. For example, the pressure sensor or the capacitance sensor may be provided on a sheet adhered to or wound on the arm or the hand of the user. For example, the pressure sensor or the capacitance sensor may be provided on clothes (a sleeve of the clothes) of the user.

In a case where the sensor is the capacitance sensor, the user touches a location where the sensor is worn. Consequently, a change in electrostatic capacitance is detected by the capacitance sensor. For example, in a case where the sensor is the pressure sensor, the user applies pressure to a location where the sensor is worn. Consequently, the pressure is detected by the pressure sensor.

In a case where the capacitance sensor or the pressure sensor is used, the operation detection unit 2100 or the device 70 in the above-described detection method 2 or detection method 3 performs a process performed according to detection of vibration applied to the arm portion of the user, according to detection of a change in electrostatic capacitance of a predetermined value or more in the capacitance sensor or detection of pressure of a predetermined value or more in the pressure sensor.

Note that an action (an action of applying vibration) for causing the sensor to perform detection may be performed by using an operation body, or may be performed by using objects other than the operation body.

<<Region in which Operation Detection Unit 2100 Detects Operation Body>>

The operation detection unit 2100 may perform a process of detecting an operation body on the entire operation image, or may perform the process on a partial region of a captured image. In the latter case, among regions included in the operation image, the operation detection unit 2100 restricts a region (hereinafter, referred to as a detection region) in which an operation body to be detected to a region in which the operation body is expected to be located when the operation image 60 is operated.

Hereinafter, specific examples of such a restriction method will be described.

<<Restriction Method 1>>

The operation detection unit 2100 sets a region in which the operation image 60 is displayed by the display control unit 2040 as a detection region among regions included in a captured image. Here, as the "region in which the operation image 60 is displayed by the display control unit 2040 among regions included in a captured image", a region calculated by the display control unit 2040 within a display process of the operation image 60 may be used. Note that, in a case where a transmissive head mounted display is used, the operation image 60 is not displayed on a captured image. In this case, the "region in which the operation image 60 is displayed by the display control unit 2040 among regions included in a captured image" indicates a region in which a region of the operation image 60 on the display screen 32 is mapped onto the captured image.

<<Restriction Method 2>>

The operation detection unit 2100 determines a detection region of an operation body based on the first marker 50 captured in a captured image. This is because a position of the operation body when the operation image 60 is operated is located in a region in which the operation image 60 is displayed, and the region in which the operation image 60 is displayed is determined based on the first marker 50.

Figure 23:
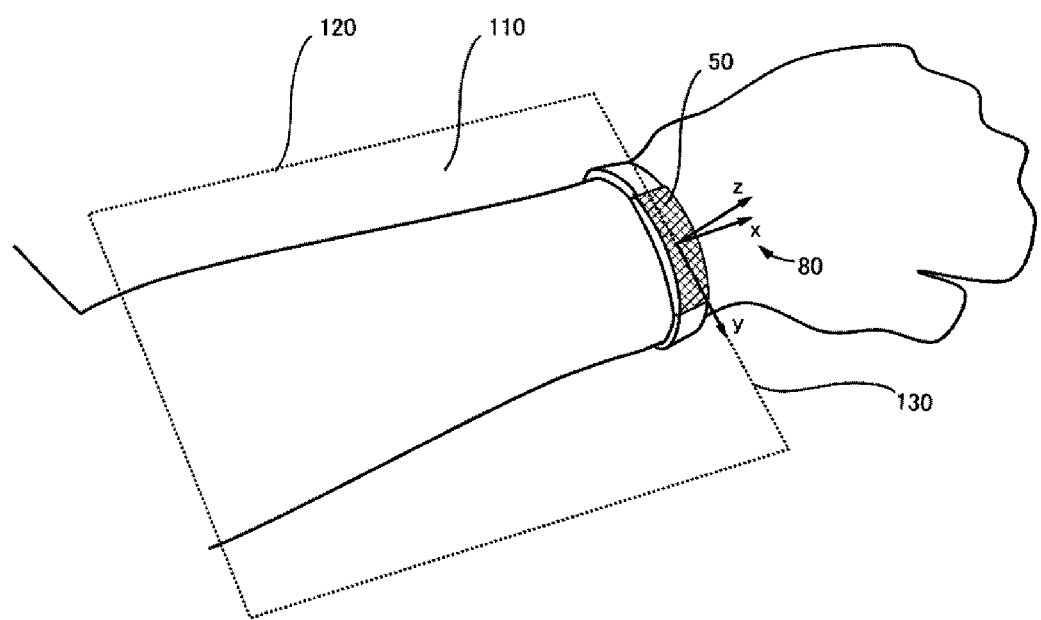
FIG. 23 is a diagram illustrating a detection region in a case where the first marker is located on the left arm portion of the user.

For example, first, the operation detection unit 2100 recognizes whether it is the left arm portion or the right one of the user on which the first marker 50 is located according to various methods described in Example Embodiment 1. The operation detection unit 2100 restricts a detection region by taking into consideration the arm portion on which the first marker 50 is located of the left and right arm portions of the user. FIG. 23 is a diagram illustrating a detection region in which the first marker 50 is located on the left arm portion of the user. A detection region 110 is an xy plane in the coordinate system 80 defined based on the first marker 50, and a position thereof in the x direction is a position in a negative direction with the origin of the coordinate system 80 as a reference.

In the detection region 110, a length of aside 120 which is a side in the x direction or a side 130 which is a side in the y direction is, for example, a predetermined length which is set in advance. However, the operation detection unit 2100 may set a length of the side 120 or the side 130 to the predetermined length, and then may gradually reduce the length so as to gradually reduce a size of the detection region 110. Specifically, the operation detection unit 2100 reduces the detection region 110 in a case where, among regions included in the detection region 110, an operation body is not detected for a predetermined period or more in a region far away from the center. For example, it is assumed that, among regions included in the detection region 110, a region which will not be included in the detection region 110 in a case where the side 130 is reduced by a predetermined length is not operated for a predetermined period. In this case, the operation detection unit 2100 reduces the side 130 by the predetermined length. Since there is an individual difference in a size or a thickness of the arm portion, the operation detection unit 2100 gradually reduces the detection region 110 so as to be able to cope with such an individual difference. Note that each of the predetermined values may be set in the operation detection unit 2100 in advance, or may be stored in a storage device which can be accessed by the operation detection unit 2100.

According to the interface control system 2000, since a display position or the like of the operation image 60 is defined with the first marker 50 as a reference, as described above, a detection region of an operation body can be restricted with the first marker 50 as a reference. Therefore, it is possible to easily restrict a detection region of an operation body. The time required to detect the operation body is reduced by restricting the detection region of the operation body.

In a case where the operation image 60 is displayed on the arm portion of the user, the background of the detection region restricted as described above is the user's bare skin or a sleeve of clothes. Thus, a color or a pattern of the background is simpler than in a case where general scenery is the background. Therefore, detection of an operation body is facilitated.

<Details of Process Performed by Operation Target Determination Unit 2120>

The operation target determination unit 2120 determines an operation target on which an operation body is superimposed among a plurality of operation targets. The operation target determination unit 2120 determines the operation target on which the operation body is superimposed, as an operation target to which an operation is applied.

Figure 24:
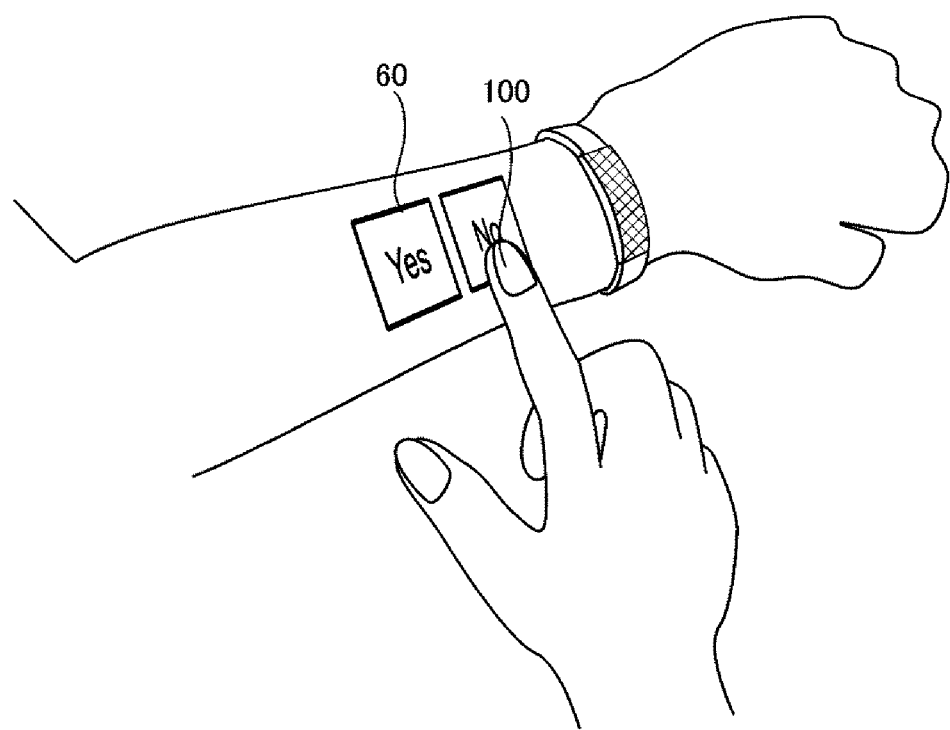
FIG. 24 is a diagram illustrating a scene in which an operation image describing a selection button is operated.

FIG. 24 is a diagram illustrating a scene in which the operation image 60 describing selection buttons is operated. In FIG. 24, the finger 100 of the user is superimposed on a region of NO. Thus, the operation target determination unit 2120 determines that an operation target is the button of NO.

Among systems using a head mounted display, there is a system which determines an operation target by analyzing vibration applied to the arm portion. However, in a case of using such a system, it is necessary to perform calibration for obtaining in advance information regarding "a relationship between a tapped position and detected vibration". In contrast, according to the operation target determination unit 2120, it is possible to determine an operation target without performing calibration. Therefore, there is an advantage that the interface control system 2000 can be more easily used.

Figure 25:
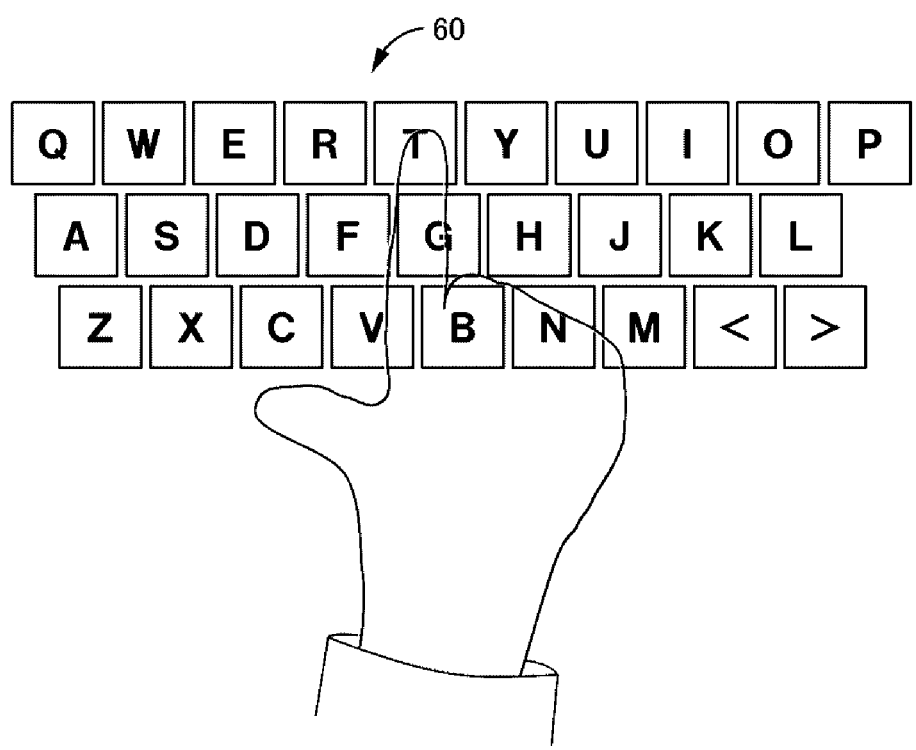
FIG. 25 is a diagram illustrating a scene in which an operation image describing a keyboard is operated when seen in a plan view.

Here, there is a case where an operation body may be superimposed on only a single operation target, or may be superimposed on a plurality of operation targets. FIG. 25 is a diagram illustrating a scene in which the operation image 60 describing a keyboard is operated. In FIG. 25, the user's hand is superimposed on a plurality of keys. In this case, an operation target cannot be determined under only the condition that "the operation body is superimposed". Therefore, in this case, the operation target determination unit 2120 determines the operated operation target among a plurality of operation targets on which the operation body is superimposed. Hereinafter, a specific method thereof will be described.

<<Determination Method 1>>

The operation target determination unit 2120 calculates an operation point by using a region indicating an operation body captured in a captured image. For example, the operation point is a fingertip or a pentip. The operation target determination unit 2120 determines an operation target superimposed on the operation point as an operation target to which an operation is applied.

Figure 26:
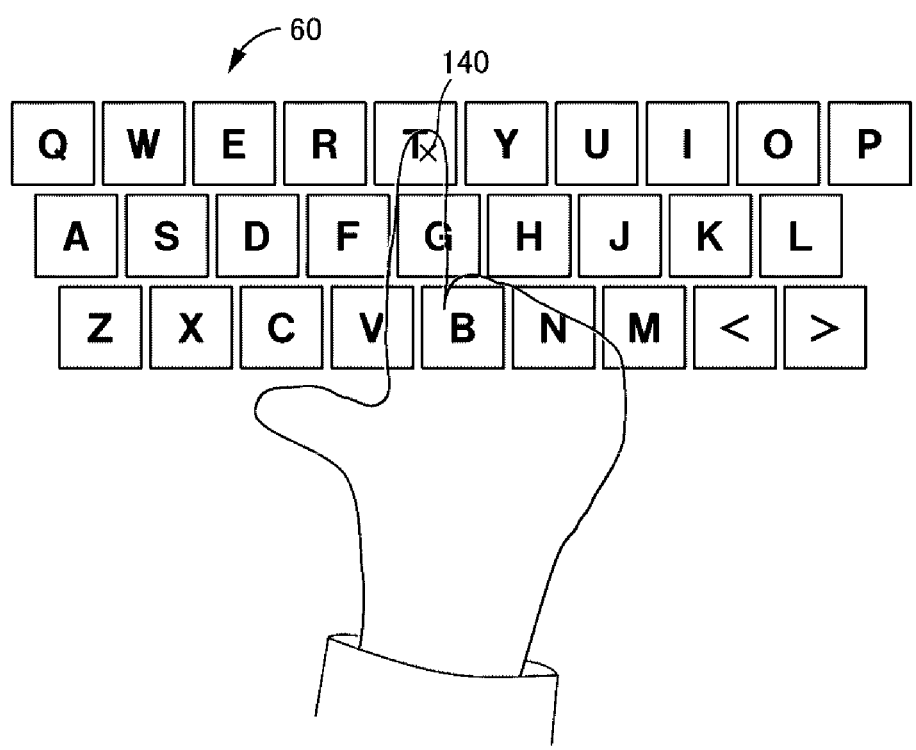
FIG. 26 is a diagram illustrating a scene in which an operation target is determined by using an operation point.

FIG. 26 is a diagram illustrating a scene in which an operation target is determined by using an operation point. In FIG. 26, an operation point is an operation point 140. Therefore, the operation target determination unit 2120 determines that an operation target is the T key.

Here, there are various methods of the operation target determination unit 2120 calculating an operation point. For example, the operation target determination unit 2120 calculates the center of a region indicating an operation body captured in a captured image. The operation target determination unit 2120 sets a point which is farthest from the center as an operation point in the region indicating the operation body.

According to the above-described method, for example, a fingertip or a pentip is an operation point. However, for example, in a case where the operation image 60 is operated by tapping the arm portion with the finger, the arm portion may be tapped not with a fingertip but with a finger cushion. Therefore, the operation target determination unit 2120 may calculate a point which is farthest from the center of the operation body, or may set a location slightly shifted from the point as an operation point. For example, in this case, a positional relationship between a point which is farthest from the center of an operation body and an operation point is defined in advance.

For example, a marker for determining an operation point may be attached to an operation body. In this case, the operation target determination unit 2120 detects the marker for determining an operation point by analyzing a captured image, and sets a detected position thereof as the operation point.

The marker for determining an operation point is any marker whose position in a captured image can be determined. Information indicating what kind of marker is be detected as a marker for determining an operation point (a shape or the like of a marker for determining an operation point) may be set in the operation target determination unit 2120 in advance, or may be stored in a storage device which can be accessed by the operation target determination unit 2120.

A marker for determining an operation point may be directly attached to an operation body, or may be attached to an object attached to an operation body. In the latter case, for example, the user wears a ring attached with the marker for determining an operation point on the finger thereof, and operates the operation image 60 with the finger. The marker may be an image displayed on the device. For example, the user wears a ring type device having a function of displaying the marker, and operates the operation image 60.

<<Determination Method 2>>

The operation target determination unit 2120 determines an operated operation target based on a relative positional relationship among a plurality of operation targets on which an operation body is superimposed. For example, the operation target determination unit 2120 determines, as an operated operation target, an operation target which is located on the uppermost part when the operation image 60 is seen in a plan view, among operation targets on which an operation body is superimposed. For example, in a case of the example of the keyboard in FIG. 25 or 26, the operation target determination unit 2120 determines the T key located on the uppermost part when seen in a plan view as an operated operation target in the operation image 60 on which the operation body is superimposed. Note that the operation image 60 when seen in a plan view as illustrated in FIG. 25 or 26 may be obtained, for example, by cropping a region of the operation image 60 included in a captured image, and performing coordinate conversion based on the coordinate system 80 defined by the first marker 50.

Here, the operation target determination unit 2120 is required to recognize which direction in the operation image is an upward direction when seen in a plan view of the operation image 60. In relation to this fact, as described in Example Embodiment 1, in order for the display control unit 2040 to display the operation image 60, a relationship between the coordinate system 80 defined by the first marker 50 captured in a captured image and a posture of the operation image 60 is defined in advance. Thus, the operation target determination unit 2120 can recognize which direction in the operation image is an upward direction when seen in a plan view of the operation image 60 by using this relationship. In the example illustrated in FIG. 10 described in Example Embodiment 1, an upward direction when seen in a plan view of the operation image 60 is a −y direction of the coordinate system 80.

For example, the operation target determination unit 2120 may change a method of determining an operation target depending on whether it is the left arm portion or the right one on which the operation image 60 is superimposed. Specifically, in a case where the arm portion on which the operation image 60 is superimposed is the left arm portion, the operation target determination unit 2120 determines an operation target located on the leftmost part when seen in a plan view of the operation image 60 among operation targets on which an operation body is superimposed, as an operated operation target. In a case where the operation image 60 is superimposed on the left arm portion, if the left arm portion is naturally held, an operation target on the left when seen in a plan view of the operation image 60 is located at a front side of an operation target on the right. In this case, if an operation body is placed on the operation target located at a front side, the operation body is also superimposed on an operation target located at back side of the operation target. On the other hand, even if the operation body is placed on the operation target located at a back side, the operation body is not superimposed on the operation target located at a front side. Thus, the operation target located on the leftmost part when seen in a plan view of the operation image 60 is considered to be an operated operation target.

For the same reason, in a case where the arm portion on which the operation image 60 is superimposed is the right arm portion, the operation target determination unit 2120 determines an operation target located on the rightmost part when seen in a plan view of the operation image 60 among operation targets on which an operation body is superimposed, as an operated operation target.

Here, there is a high probability that an operation target (for example, an operation target slightly covered with the finger) having a small range of being superimposed on an operation body may not be an operated operation target even if the operation target is located on the uppermost part. Thus, the operation target determination unit 2120 may perform the process in the above-described determination method 2 only for operation targets the predetermined proportion or higher (for example, 50% or higher) of which is superimposed by the operation body, among operation targets on which the operation body is superimposed. In the above-described way, it is possible to prevent the operation target determination unit 2120 from wrongly determining an operation target or the like slightly covered with the finger as an operated operation target. In other words, the accuracy of determining an operation target is improved.

Example Embodiment 5

An interface control system 2000 according to Example Embodiment 5 is illustrated in FIG. 1 in the same manner as, for example, in Example Embodiment 1. The interface control system 2000 of Example Embodiment 5 has the same function as that of the interface control system 2000 of any one of Example Embodiments 1 to 4 except for the following description.

Figure 27:
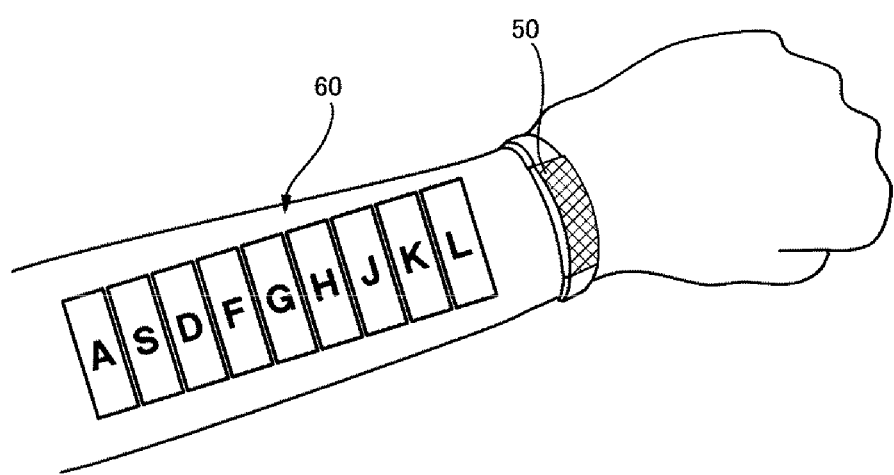
FIG. 27 is a diagram illustrating a scene in which only a part of keys of an operation image describing a keyboard are superimposed on the arm portion.

The interface control system 2000 of Example Embodiment 5 displays only a part of operation targets on the display screen 32 among a plurality of operation targets included in the operation image 60. FIG. 27 is a diagram illustrating a scene in which only a part of keys of the operation image 60 describing a keyboard are superimposed on the arm portion. In FIG. 27, only keys in the middle row among a plurality of keys included in the operation image 60 are displayed on the arm portion of the user.

As mentioned above, if only a part of the plurality of operation targets included in the operation image 60 are displayed, each operation target can be displayed to be large. Consequently, the user can easily operate an operation target, and thus there is an advantage that the operability of the interface control system 2000 is improved.

Hereinafter, a description will be made of a specific process performed by the display control unit 2040 of the present example embodiment.

For example, the display control unit 2040 calculates a posture of the arm portion of the user on which the operation image 60 is superimposed, and displays only an operation target corresponding to the posture of the arm portion. Here, a correspondence between a posture of the arm portion of the user and an operation target to be displayed is defined in advance.

There are various methods of calculating a posture of the arm portion of the user. For example, the operation target determination unit 2120 sets a posture of the first marker 50 captured in a captured image as a posture of the arm portion of the user. For example, the operation target determination unit 2120 calculates a posture of the arm portion of the user by using a sensor attached to the arm portion of the user. For example, the sensor is an acceleration sensor used to detect vibration applied to the arm portion of the user, described in Example Embodiment 4.

Figure 28:
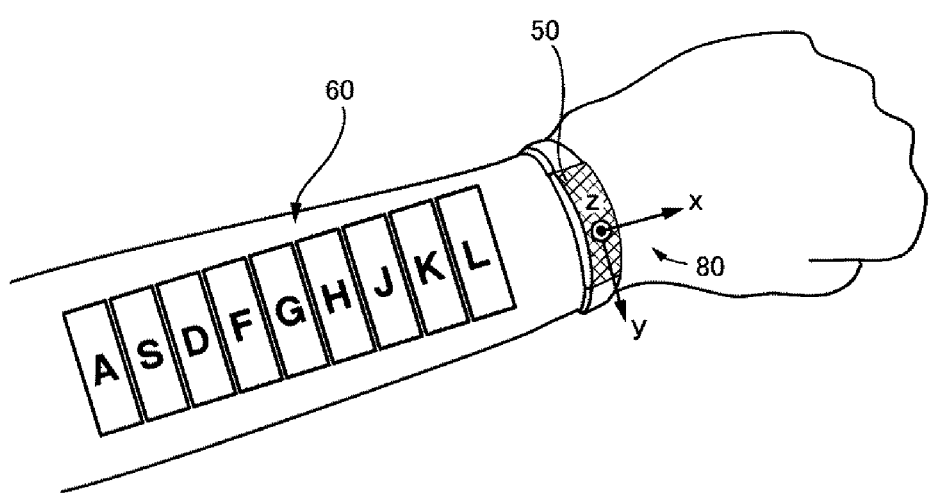
FIG. 28 is a diagram illustrating a scene in which an operation target corresponding to the first marker is displayed.
Figure 29:
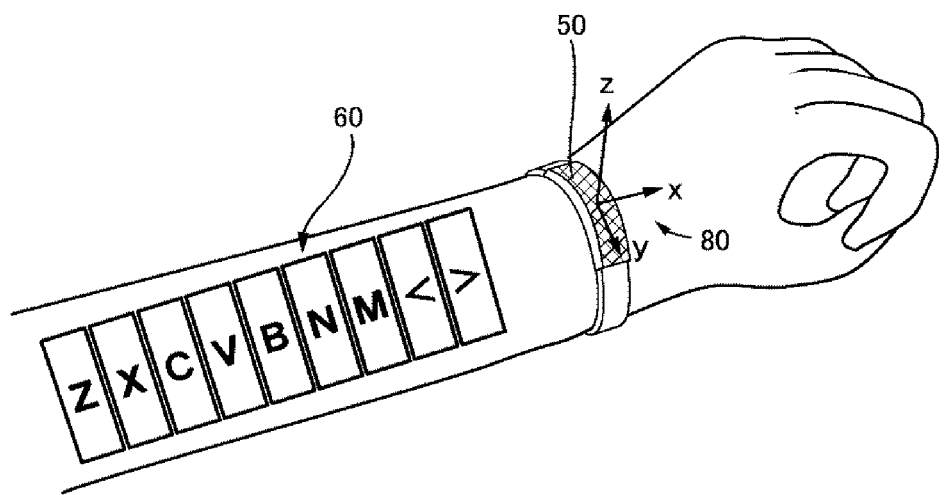
FIG. 29 is a diagram illustrating a scene in which an operation target corresponding to the first marker is displayed.

A description will be made of an example of changing an operation target to be displayed according to a posture of the first marker 50 with reference to FIGS. 28 and 29. FIGS. 28 and 29 are diagrams illustrating states in which an operation target is displayed according to a posture of the first marker 50. In FIG. 28, the z direction of a posture of the first marker 50 is directed toward the eyes of the user. In other words, it can be described that the user is viewing the first marker 50 from the front. Therefore, the display control unit 2040 displays keys in the middle row of the keyboard described by the operation image 60.

In contrast, in FIG. 29, the z direction of a posture of the first marker 50 is directed further upward than in the case of FIG. 28. In other words, it can be described that the user is looking up the first marker 50 from the lower side. Therefore, the display control unit 2040 displays keys in the lower row of the keyboard indicated by the operation image 60. Note that, similarly, in a case where the z direction of a posture of the first marker 50 is directed further downward than in the case of FIG. 28, the display control unit 2040 displays keys in the upper row of the keyboard described by the operation image 60 (not illustrated).

In order to realize a process in the examples in FIGS. 28 and 29, for example, information in which a range of an angle formed between a visual line direction of the user (a direction in which a captured image is seen in a plan view) and the z direction of a posture of the first marker 50 is associated with each row of the keyboard is held in advance. This information may be set in the display control unit 2040 in advance, or may be stored in a storage device which can be accessed by the display control unit 2040.

For example, in a case where a predetermined operation is performed on the head mounted display 30 or the device 70, the operation target determination unit 2120 may determine an operation target to be displayed according to the operation. The predetermined operation is, for example, pressing of a button provided on the head mounted display 30, or a tapping operation performed on the display screen 72 of the device 70.

Note that the operation target determination unit 2120 may constantly display only a part of operation targets, or may switch between a mode of displaying a part of operation targets and a mode of displaying all operation targets. In the latter case, for example, in a case where a predetermined operation is performed on the head mounted display 30 or the device 70, the operation target determination unit 2120 switches between the modes.

Example Embodiment 6

An interface control system 2000 according to Example Embodiment 6 is illustrated in FIG. 1 in the same manner as, for example, in Example Embodiment 1. The interface control system 2000 of Example Embodiment 6 has the same function as that of the interface control system 2000 of any one of Example Embodiments 1 to 5 except for the following description.

The display control unit 2040 of Example Embodiment 6 combines an image of the hand with a portion of the operation image 60 on which the hand of the user operating the operation image 60 is superimposed, and then displays the operation image 60.

Figure 30:
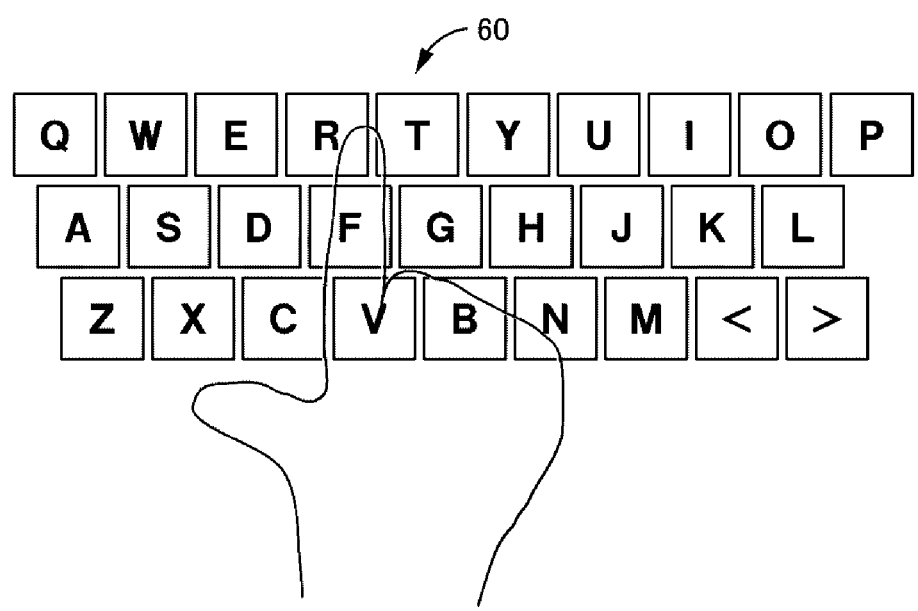
FIG. 30 is a diagram illustrating an operation image included in a view of a user and the hand of the user operating the operation image when seen in a plan view, in a case where an image of the hand is not combined with the operation image.

FIG. 30 is a diagram illustrating the operation image 60 included in a view of a user and the hand of the user operating the operation image 60 when seen in a plan view in a case where an image of the hand is not combined with the operation image 60. In a case of FIG. 30, when viewed from the eyes of the user, the operation image 60 appears to be superimposed on the hand operating the operation image 60. In contrast, in a case where the user handles a real keyboard, the user views the hand on the keyboard, and thus the keyboard of a portion on which the hand is placed is hidden by the hand and thus is not viewed. As mentioned above, the state viewed by the user in the case of FIG. 30 is different from the state viewed by the user in the case of handling a real keyboard, and thus some users may feel uncomfortable.

Figure 31:
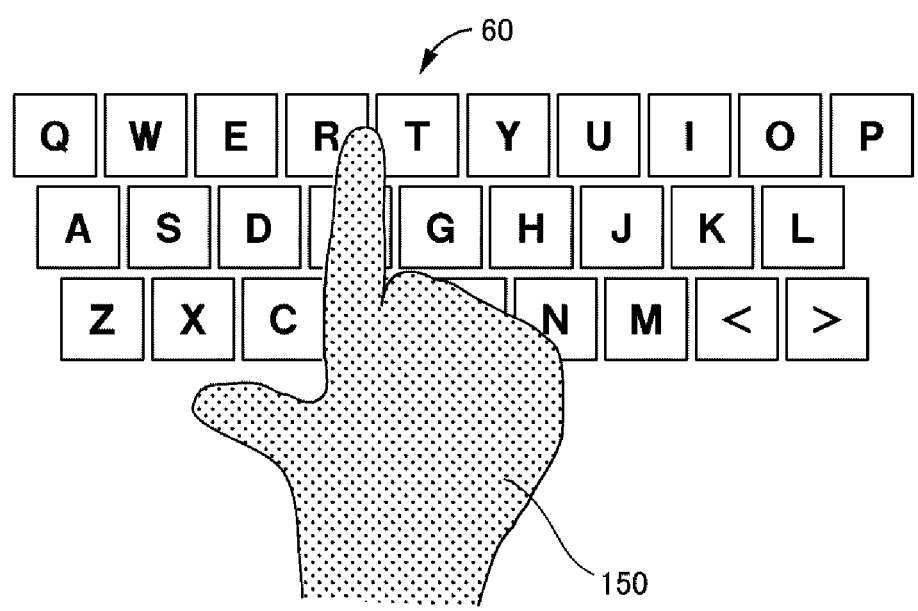
FIG. 31 is a diagram illustrating the operation image included in the view of the user and the hand of the user operating the operation image when seen in a plan view, in a case where an image of the hand is combined with the operation image.

FIG. 31 is a diagram illustrating the operation image 60 included in the view of the user and the hand of the user operating the operation image 60 when seen in a plan view in a case where an image of the hand (hand image 150) is combined with the operation image 60. In a case of FIG. 31, the hand appears to be placed on the keyboard in the same manner as in a case of handling a real keyboard. Therefore, compared with the case of FIG. 30, a state captured in the eyes of the user becomes more natural, and thus there is an advantage that a user feels less uncomfortable.

Here, any image of the hand of the user may be combined with the operation image 60. For example, the image may be an image shaped like a human hand, or may be an image shaped like a robot's hand. An image combined with the operation image 60 may be a part of the hand. For example, the display control unit 2040 combines an image of the finger with only the finger (in FIG. 31, the forefinger) used for an operation so that the image is superimposed on the finger.

Note that the display control unit 2040 may not display a portion of the operation image 60 overlapping the hand of the user operating the operation image 60 instead of combining an image of the hand with the operation image 60.

Example Embodiment 7

Figure 32:
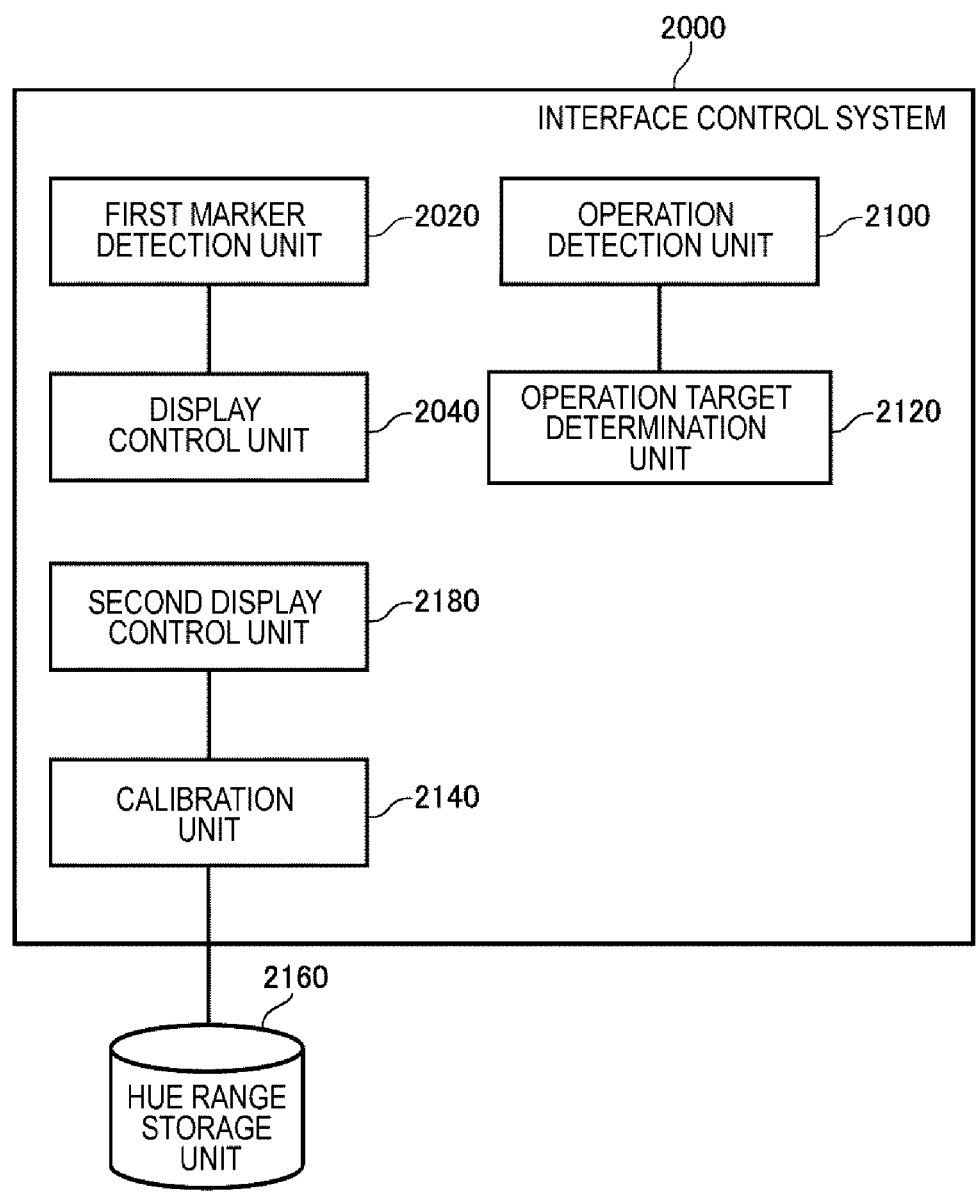
FIG. 32 is a block diagram illustrating an interface control system according to Example Embodiment 7.

FIG. 32 is a block diagram illustrating an interface control system 2000 according to Example Embodiment 7. In FIG. 32, each block indicates not a configuration in the hardware unit but a configuration in the functional unit. The interface control system 2000 of Example Embodiment 7 has the same function as that of the interface control system 2000 of any one of Example Embodiments 1 to 6 except for the following description.

The interface control system. 2000 of Example Embodiment 7 includes a calibration unit 2140 and a second display control unit 2180. The calibration unit 2140 performs calibration on an operation body. The second display control unit 2180 will be described later.

It is assumed that an operation body is captured in a specific region in a captured image generated by the camera 20 as a premise that the calibration unit 2140 performs calibration. The calibration unit 2140 calculates a hue range with respect to the specific region in the captured image. The calibration unit 2140 stores the calculated hue range in a hue range storage unit 2160 as a hue range of an operation body. Note that the hue range storage unit 2160 may be provided in the computer 1000 implementing the interface control system 2000, or may be provided outside the computer 1000.

The operation detection unit 2100, the operation target determination unit 2120, or both of the units of Example Embodiment 7 use the hue range of an operation body stored in the hue range storage unit 2160 in order to detect an operation body from a captured image (to determine whether or not the operation body is captured in the captured image or to calculate an operation point). Here, an operation body may be detected by using, for example, a known object recognition technique. In this case, the operation detection unit 2100 or the operation target determination unit 2120 extracts only a region included in the hue range of the operation body from the captured image before performing object recognition on the captured image. The object recognition is performed on the extracted region.

<Method of Causing Operation Body to be Captured in Specific Region>

As described above, the calibration unit 2140 performs calibration only when an operation body is captured in a specific region of a captured image. Thus, the operation body is required to be captured in the specific region.

For this reason, the interface control system 2000 includes the second display control unit 2180. The second display control unit 2180 displays a guide image indicating a region in which an operation body is to be disposed, on the display screen 32. The calibration unit 2140 performs the above-described calibration on a captured image subsequently generated by the camera 20. The specific region on the captured image as a calculation target of a hue range of an operation body is a region corresponding to the "region in which the operation body is to be disposed" indicated by the guide image. Note that a correspondence relationship between a region on a captured image and a region on the display screen 32 is defined based on various parameters (an angle of view or a focal length) regarding the camera 20, a positional relationship between the display screen 32 and the camera 20, or the like. This correspondence relationship may be calculated by the calibration unit 2140 by using such parameters, or may be defined as a set value in advance.

Figure 33A:
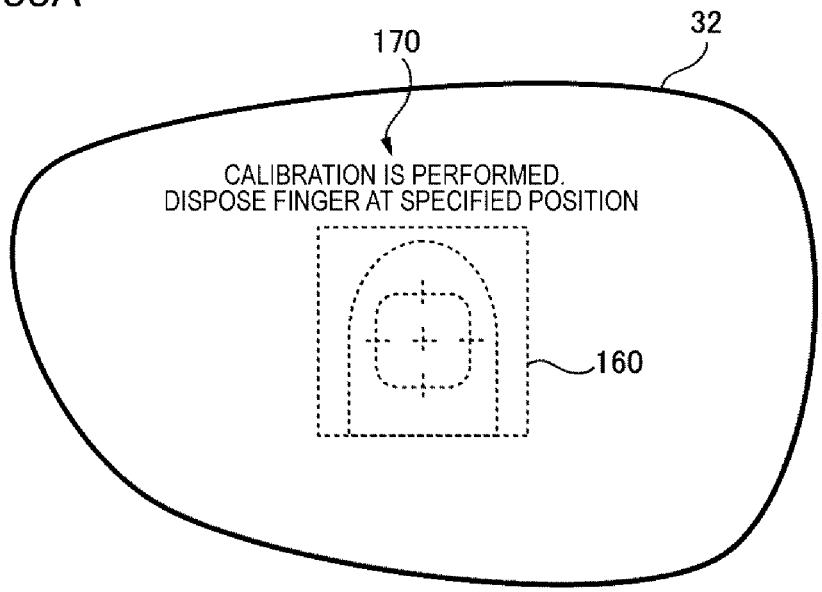
FIGS. 33A and 33B are first diagrams illustrating a guide image displayed on a display screen.
Figure 33B:
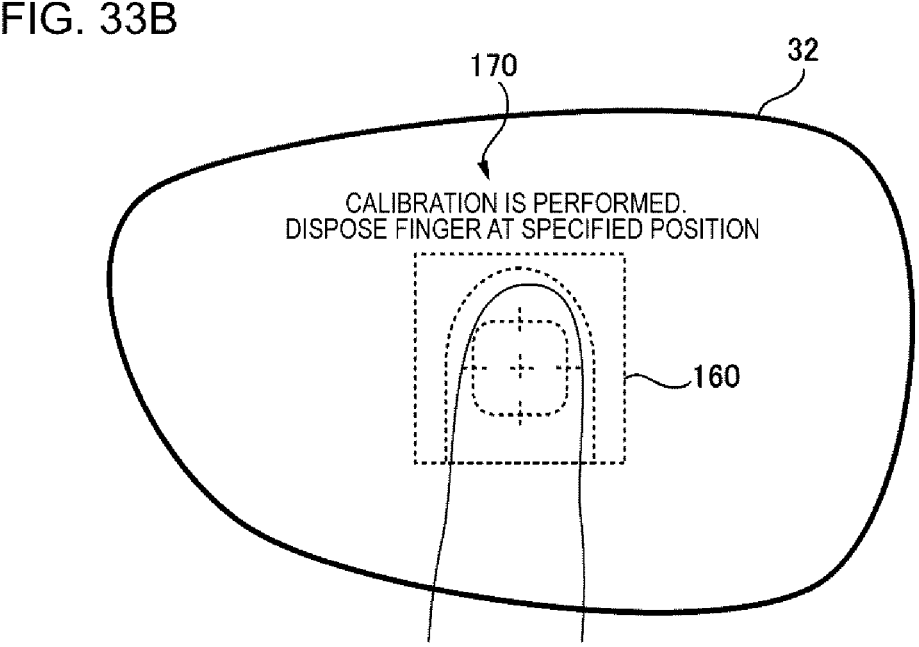

FIGS. 33A and 33B are first diagrams illustrating a guide image displayed on the display screen 32. In the example illustrated in FIGS. 33A and 33B, the second display control unit 2180 displays a guide image 160 at a predetermined position (for example, the center) on the display screen 32. The second display control unit 2180 displays an explanation image 170 near the guide image 160. The explanation image 170 is an image including an explanation indicating an action to be performed by a user. A user of the interface control system 2000 disposes an operation body (for example, the finger) so that the operation body is included in the guide image 160. The calibration unit 2140 calculates a hue range with respect to a region corresponding to the guide image 160 in the captured image.

In a case of FIGS. 33A and 33B, a position at which the guide image 160 is displayed is fixed, and thus a hue range calculation target region in the captured image is also fixed.

Figure 34A:
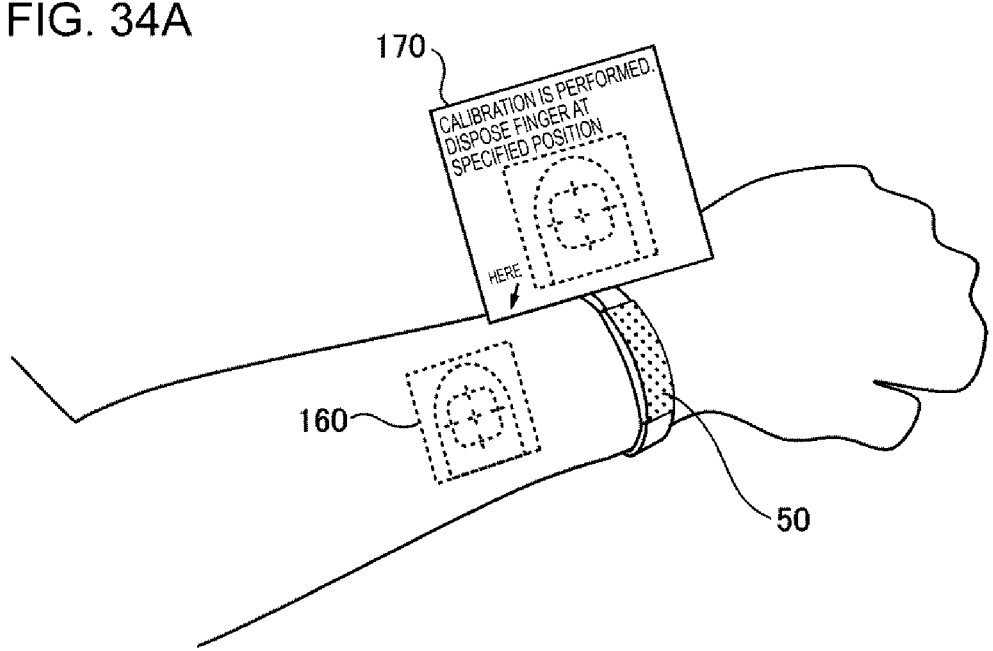
FIGS. 34A and 34B are second d illustrating a guide image displayed on a display screen.
Figure 34B:
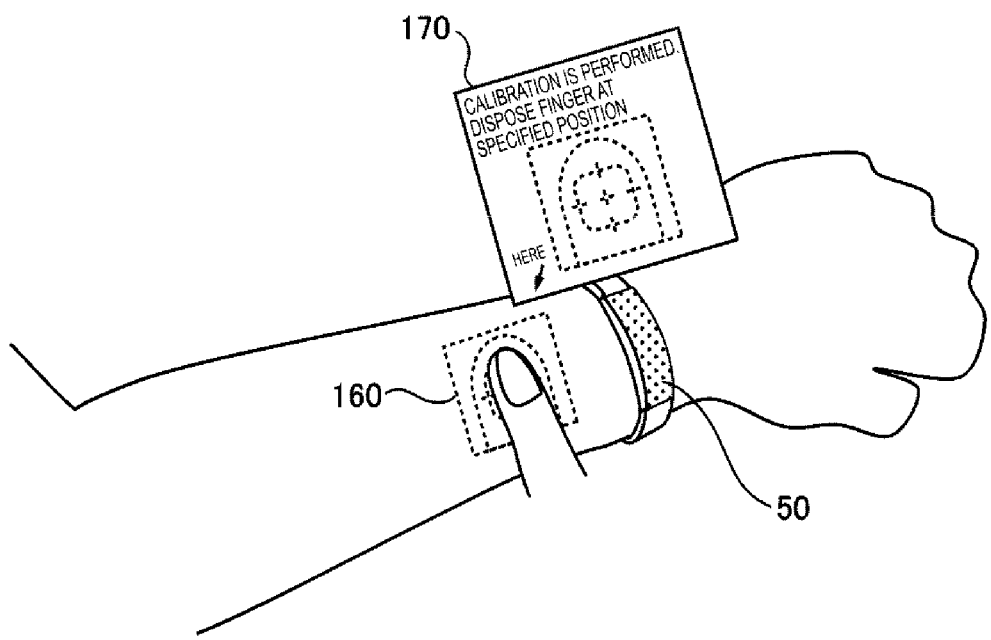

FIGS. 34A and 34B are second diagrams illustrating a guide displayed on the display screen 32. In the example illustrated in FIGS. 34A and 34B, a position of the guide image 160 and a position and a posture of the explanation image 170 are relatively defined for a position and a posture of the first marker 50.

In a case of FIGS. 34A and 34B, a position at which the guide image 160 is displayed is not fixed, and thus a hue range calculation target region in the captured image is not fixed either. Therefore, the calibration unit 2140 calculates a hue range calculation target region in a captured image based on a position of the guide image 160 on the display screen 32 at the time at which the captured image as a calibration target is generated.

<Timing for Performing Calibration>

An operation body is required to be disposed in a specific region when the calibration unit 2140 performs calibration. Here, the calibration unit 2140 may or may not detect that the operation body is disposed in the specific region. In the former case, for example, the calibration unit 2140 detects that the operation body is disposed in the specific region based on detection in the above-described sensor. In this case, the user performs an action which causes the sensor to perform detection in a state in which the operation body is disposed at a position indicated by the guide image 160. For example, in a case where an acceleration sensor is provided as the sensor, the user taps a location indicated by the guide image 160. The calibration unit 2140 performs calibration on a captured image which is generated at a timing at which the sensor performs detection or at a timing close to the detection timing.

The calibration unit 2140 may not detect that the operation body is disposed in the specific region or may start execution of calibration. For example, the calibration unit 2140 acquires a captured image which is generated after a predetermined time elapses from the time at which the guide image 160 is displayed by the second display control unit 2180, and performs calibration on the captured image. In this case, it is preferable that a remaining time by acquisition of the captured image (a remaining time by execution of imaging for calibration) is displayed in the explanation image 170.

<Hue Range of Operation Body>

The calibration unit 2140 calculates a hue range of an operation body based on hue of a specific region in a calibration target captured image. For example, the calibration unit 2140 calculates a hue of each pixel included in the specific region, and defines a hue range of the operation body by using a statistical value of calculated hues. For example, the calibration unit 2140 calculates an average value $\mu$ and a standard deviation $\sigma$ of hues of respective pixels included in the specific region, and sets a range of "from $\mu-k\sigma$ or more, to $\mu+k\sigma$ or less" as a hue range of the operation body. Here, k is any real number.

Figure 35:
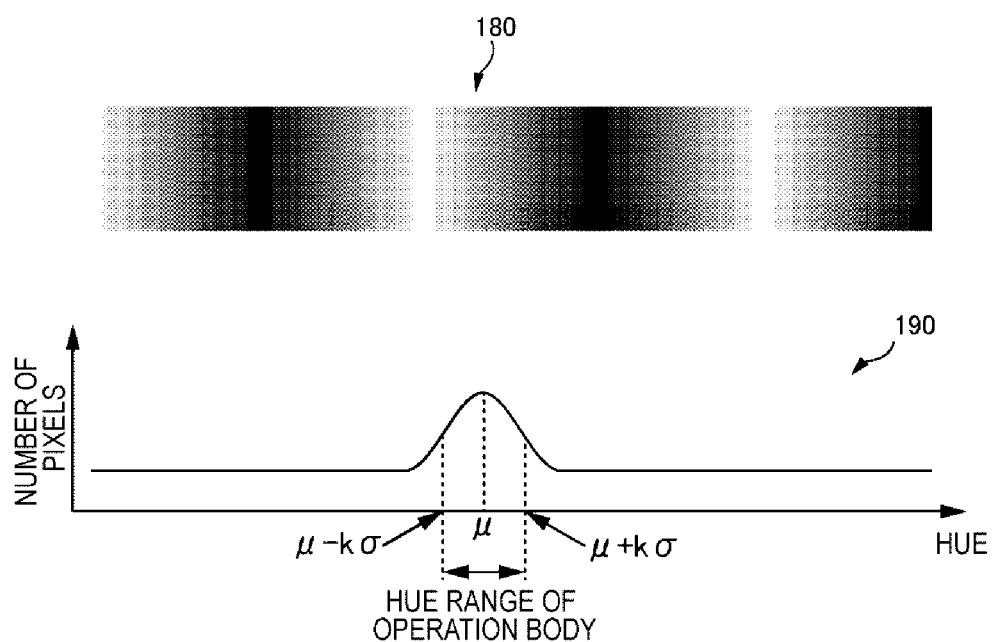
FIG. 35 is a first diagram illustrating a hue range of an operation body.

FIG. 35 is a first diagram illustrating a hue range of an operation body. A spectrum 180 indicates a spectrum, and a histogram 190 indicates a histogram of hues included in a hue range calculation target region. An x axis of the histogram 190 expresses a hue. A y axis of the histogram 190 expresses the number of pixels. Note that, for convenience of illustration, the spectrum 180 is illustrated in monochrome.

<Calibration on Background>

The calibration unit 2140 may also calculate a hue range with respect to a region (hereinafter, referred to as a background region) serving as the background of an operation body when a user uses the interface control system 2000, and may calculate a hue range of the operation body by using the hue range. Specifically, the calibration unit 2140 calculates a hue range of the background region in the same manner as in the method of calculating a hue range of an operation body. The calibration unit 2140 excludes a region included in a hue range of the background region from the hue range calculated with respect to the specific region which is a calculation target of a hue range of the operation body. The calibration unit 2140 sets a hue range remaining as a result of the exclusion, as a hue range of the operation body.

Figure 36:
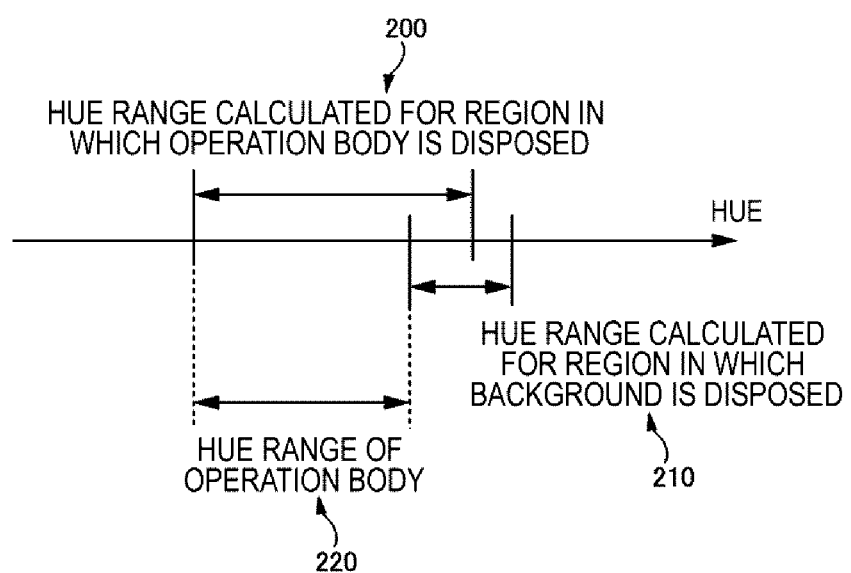
FIG. 36 is a second diagram illustrating a hue range of an operation body.

FIG. 36 is a second diagram illustrating a hue range of an operation body. A hue range 200 is a hue range calculated with respect to a region in which an operation body is disposed. A hue range 210 is a hue range calculated with respect to a region in which the background is disposed. The calibration unit 2140 sets a hue range 220 remaining by excluding the hue range 210 from the hue range 200, as a hue range of an operation body.

<<Method of Calculating Hue Range of Background>>

The calibration unit 2140 performs calibration on the background in a state in which the background is disposed in a specific region of an operation image. The specific region may or may not be the same as a region in which an operation body is disposed. In the former case, for example, first, the calibration unit 2140 performs calibration in a state in which an operation body is disposed in the specific region so as to calculate a first hue range (the hue range 200 in FIG. 36). Next, the calibration unit 2140 performs calibration in a state in which a background region is disposed in the specific region so as to calculate a second hue range (the hue range 210 in FIG. 36). The calibration unit 2140 excludes the second hue range from the first hue range so as to calculate a hue range of the operation body (the hue range 220 in FIG. 36). In this case, two captured images are required to calculate the hue range of the operation body.

On the other hand, in a case where a specific region in which an operation body is disposed is different from a specific region in which the background is disposed, the calibration unit 2140 may calculate a hue range of the operation body by using a single captured image. For example, the calibration unit 2140 handles a partial region included in the guide image 160 as a region in which an operation body is disposed, and handles a remaining region included in the guide image 160 as a region in which the background is disposed.

Figure 37:
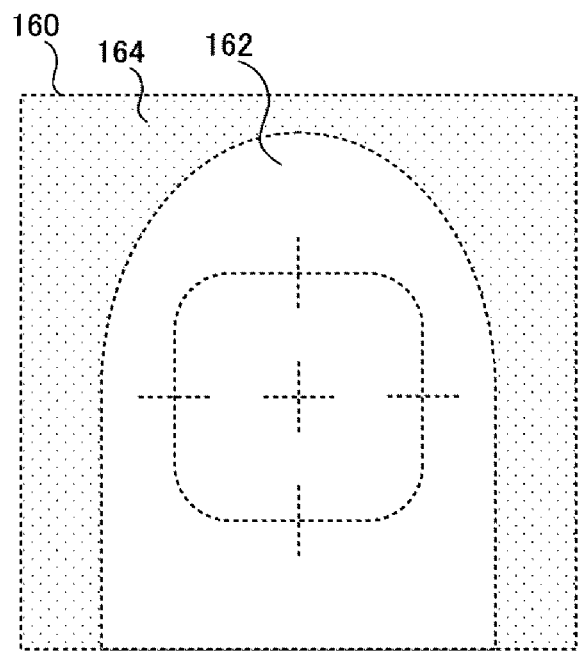
FIG. 37 is a diagram illustrating a guide image.

FIG. 37 is a diagram illustrating the guide image 160. In FIG. 36, the guide image 160 includes a portion (region 162) describing a shape of the finger, and a remaining portion (region 164). The calibration unit 2140 calculates a hue range of an operation body based on a hue of the region 162, and calculates a hue range of a background region based on a hue of the region 164. The calibration unit 2140 calculates a final hue range of the operation body by excluding the hue range calculated with respect to the region 164 from the hue range calculated with respect to the region 162.

<Hardware Configuration Example>

For example, a hardware configuration of the interface control system 2000 of Example Embodiment 7 is illustrated in FIG. 7 in the same manner as in the interface control system 2000 of Example Embodiment 1. In the present example embodiment, each program module stored in the above-described storage 1080 further includes a program for realizing each function described in the present example embodiment.

<Advantageous Effects>

According to the present example embodiment, calibration in which a hue range of an operation body is calculated in advance is performed, and detection of the operation body is performed by using the hue range in a subsequent input operation performed by a user. In the above-described way, an operation body can be calculated with high accuracy and easily.

As an example of a situation in which calibration performed by the interface control system 2000 of the present example embodiment is particularly useful, there is a situation in which the interface control system 2000 is used in a plurality of places. Generally, since a color or the like of lighting differs for each place, even if a user uses the same operation body (for example, the user's finger) at such places, a hue of the operation body captured in a captured image may differ for each place. In this case, the user performs calibration on the operation body for each place in which the interface control system 2000 is used. In the above-described way, an operation body can be calculated with high accuracy even if a place in which the interface control system 2000 is used is changed.

The interface control system 2000 of the present example embodiment may perform calibration on the background so as to exclude a hue range of a background region from a hue range of an operation body. In the above-described way, a region having a hue included in a hue range of the background can be excluded from a region included in a captured image, and then object recognition for detecting an operation body can be performed. Thus, it is possible to detect an operation body with higher accuracy and easily.

Modification Examples

Calibration performed by the interface control system 2000 of Example Embodiment 7 may be used for only calculation of a hue range of the background. In this case, the operation detection unit 2100 or the operation target determination unit 2120 excludes a region having a hue included in a hue range of a background region from a captured image, and performs object recognition or the like on a remaining region so as to detect an operation body. In the above-described way, the background region which is a peripheral region of the operation body is excluded from the captured image, and thus it is possible to detect the operation body with high accuracy and easily.

As mentioned above, the example embodiments of the present invention have been described with reference to the drawings, but these are only examples of the present invention, and various configurations other than the above-described configurations may be employed.

Hereinafter, examples of reference embodiments are added.

1. An interface control system including:

a detection unit detecting a first marker attached to the body of a user based on an image obtained from a camera attached to the user;

a display control unit displaying an operation image on a display screen of a head mounted display mounted on the user based on the first marker detected by the detection unit so that the operation image is superimposed on the body of the user and is visually recognized by the user; and an operation detection unit determining whether or not the operation image is operated by the user.

2. The interface control system according to 1., in which the detection unit determines a position, a size, or a posture of the first marker by detecting the first marker, and in which the display control unit determines a position, a size, or a posture of the operation image in the display screen of the head mounted display based on the position, the size, or the posture of the first marker determined by the detection unit.

3. The interface control system according to 1. or 2., in which the first marker is an image displayed on a display screen of a device attached to the arm portion of the user.

4. The interface control system according to any one of 1. to 3., in which the display control unit determines the operation image to be displayed based on a type of first marker captured in an image obtained from the camera.

5. The interface control system according to 3., further including a second display control unit changing types of first markers displayed on the display screen of the device in response to a user operation on the device, in which the detection unit determines the type of first marker detected from the image obtained from the camera, and in which the display control unit changes a currently displayed operation screen to an operation screen corresponding to the determined type of first marker.

6. The interface control system according to any one of 1. to 5., in which the display control unit changes the operation image to be displayed based on an operation performed on the operation image by the user.

7. The interface control system according to any one of 1. to 6., in which the first marker is an image displayed on a display screen of a device attached to the arm portion of the user, and in which the interface control system further includes a first marker determination unit extracting a feature of the background in an image obtained from the camera, and determining a shape, a pattern, or a color of the first marker displayed on the display screen of the device based on the extracted feature.

8. The interface control system according to any one of 1. to 7., in which the display control unit performs:

displaying a second marker on the display screen of the head mounted display; and displaying the operation image in a case where a positional relationship between the first marker visually recognized by the user through the head mounted display and the second marker becomes a predetermined positional relationship.

9. The interface control system according to 8., in which the detection unit detects the first marker from a partial region corresponding to the second marker displayed at a partial predetermined position on the display screen of the head mounted display.

10. The interface control system according to any one of 1. to 9., in which the first marker is an image displayed on a display screen of a device attached to the arm portion of the user, in which the interface control system further includes a second display control unit performing predetermined display on the display screen of the device in a case where predetermined vibration is detected by a sensor detecting vibration of the arm portion of the user, and in which the operation detection unit determines that the operation image is operated by the user in a case where the predetermined display is imaged by the camera.

11. The interface control system according to any one of 1. to 9., in which the operation detection unit determines that the operation image is operated by the user in a case where predetermined vibration is detected by a sensor detecting vibration of the arm portion of the user.

12. The interface control system according to any one of 1. to 9., in which the operation detection unit detects an operation body from a part of regions defined based on the first marker among regions included in an image obtained from the camera, and determines that the operation image is operated by the user in a case where the operation body is detected from the part of regions.

13. The interface control system according to any one of 1. to 12., further including an operation target determination unit determining an operation target which overlaps the hand of the user with an area of a predetermined proportion or higher as an operation target operated by the user among a plurality of operation targets, in a case where the plurality of operation targets are included in the operation image, and where the hand of the user performing an operation on the operation image overlaps the plurality of operation targets.

14. The interface control system according to any one of 1. to 13., further including an operation target determination unit determining an operation target which is located on a leftmost part or a rightmost part as an operation target operated by the user among a plurality of operation targets, in a case where the plurality of operation targets are included in the operation image, and where the hand of the user performing an operation on the operation image overlaps the plurality of operation targets.

15. The interface control system according to any one of 1. to 14., in which, in a case where the operation image visually recognized by the user through the head mounted display overlaps the hand of the user operating the operation image, the display control unit displays an operation image in which an image of the hand is superimposed on a position where the hand of the user is located, on the display screen of the head mounted display.

16. The interface control system according to any one of 1. to 15., in which the display control unit displays only a part of the operation image according to a posture of the body of the user.

17. An interface control apparatus including each unit according to any one of 1. to 16.

18. An interface control method executed by a computer, the method including:

a detection step of detecting a first marker attached to the body of a user based on an image obtained from a camera attached to the user;

a display control step of displaying an operation image on a display screen of a head mounted display mounted on the user based on the first marker detected in the detection step so that the operation image is superimposed on the body of the user and is visually recognized by the user; and an operation detection step of determining whether or not the operation image is operated by the user.

19. The interface control method according to 18., in which, in the detection step, a position, a size, or a posture of the first marker is determined by detecting the first marker, and in which, in the display control step, a position, a size, or a posture of the operation image in the display screen of the head mounted display is determined based on the position, the size, or the posture of the first marker determined in the detection step.

20. The interface control method according to 18. or 19., in which the first marker is an image displayed on a display screen of a device attached to the arm portion of the user.

21. The interface control method according to any one of 18. to 20., in which, in the display control step, the operation image to be displayed is determined based on a type of first marker captured in an image obtained from the camera.

22. The interface control method according to 20., further including a second display control step of changing types of first markers displayed on the display screen of the device in response to a user operation on the device, in which, in the detection step, the type of first marker detected from the image obtained from the camera is determined, and in which, in the display control step, a currently displayed operation screen is changed to an operation screen corresponding to the determined type of first marker.

23. The interface control method according to any one of 18. to 22., in which, in the display control step, the operation image to be displayed is changed based on an operation performed on the operation image by the user.

24. The interface control method according to any one of 18. to 23., in which the first marker is an image displayed on a display screen of a device attached to the arm portion of the user, and in which the interface control method further includes a first marker determination step of extracting a feature of the background in an image obtained from the camera, and determining a shape, a pattern, or a color of the first marker displayed on the display screen of the device based on the extracted feature.

25. The interface control method according to any one of 18. to 24., in which, in the display control step:

displaying a second marker on the display screen of the head mounted display; and displaying the operation image in a case where a positional relationship between the first marker visually recognized by the user through the head mounted display and the second marker becomes a predetermined positional relationship.

26. The interface control method according to 25., in which, in the detection step, the first marker is detected from a partial region corresponding to the second marker displayed at a partial predetermined position on the display screen of the head mounted display.

27. The interface control method according to any one of 18. to 26., in which the first marker is an image displayed on a display screen of a device attached to the arm portion of the user, in which the interface control method further includes a second display control step of performing predetermined display on the display screen of the device in a case where predetermined vibration is detected by a sensor detecting vibration of the arm portion of the user, and in which, in the operation detection step, it is determined that the operation image is operated by the user in a case where the predetermined display is imaged by the camera.

28. The interface control method according to any one of 18. to 26., in which, in the operation detection step, it is determined that the operation image is operated by the user in a case where predetermined vibration is detected by a sensor detecting vibration of the arm portion of the user.

29. The interface control method according to any one of 18. to 26., in which, in the operation detection step, an operation body is detected from a part of regions defined based on the first marker among regions included in an image obtained from the camera, and it is determined that the operation image is operated by the user in a case where the operation body is detected from a part of regions.

30. The interface control method according to any one of 18. to 29., further including an operation target determination step of determining an operation target which overlaps the hand of the user with an area of a predetermined proportion or higher as an operation target operated by the user among a plurality of operation targets, in a case where the plurality of operation targets are included in the operation image, and where the hand of the user performing an operation on the operation image overlaps the plurality of operation targets.

31. The interface control method according to any one of 18. to 30., further including an operation target determination step of determining an operation target which is located on a leftmost part or a rightmost part as an operation target operated by the user among a plurality of operation targets, in a case where the plurality of operation targets are included in the operation image, and where the hand of the user performing an operation on the operation image overlaps the plurality of operation targets.

32. The interface control method according to any one of 18. to 31., in which, in the display control step, in a case where the operation image visually recognized by the user through the head mounted display overlaps the hand of the user operating the operation image, an operation image in which an image of the hand is superimposed on a position where the hand of the user is located is displayed on the display screen of the head mounted display.

33. The interface control method according to any one of 18. to 32., in which, in the display control step, only a part of the operation image is displayed according to a posture of the body of the user.

34. A program causing a computer to execute each step according to any one of 18. to 33.

The invention claimed is:

1. An interface control system comprising:
memory configured to store instructions; and
a processor configured to execute the instructions to:
detect a first marker attached to the body of a user based on an image obtained from a camera attached to the user;
display an operation image on a display screen of a head mounted display mounted on the user based on the detected first marker so that the operation image is superimposed on the body of the user and is visually recognized by the user; and
determine whether or not the operation image is operated by the user,
wherein the first marker is an image displayed on a display screen of a device attached to the arm portion of the user, and
wherein the processor is further configured to extract a feature of the background in an image obtained from the camera, and determine a shape, a pattern, or a color of the first marker displayed on the display screen of the device based on the extracted feature.

2. The interface control system according to claim 1, wherein the processor is further configured to:
determine a position, a size, or a posture of the detected first marker; and
determine a position, a size, or a posture of the operation image in the display screen of the head mounted display based on the position, the size, or the posture of the detected first marker.

3. The interface control system according to claim 1, wherein the processor is further configured to determine the operation image to be displayed based on a type of first marker captured in an image obtained from the camera.

4. The interface control system according to claim 1, wherein the processor is further configured to:
change types of first markers displayed on the display screen of the device in response to a user operation on the device;

determine the type of first marker detected from the image obtained from the camera, and change a currently displayed operation image to an operation image corresponding to the determined type of first marker.

5. The interface control system according to claim 1, wherein the processor is further configured to change the operation image to be displayed based on an operation performed on the operation image by the user.

6. The interface control system according to claim 1, wherein the processor is further configured to:
    display a second marker on the display screen of the head mounted display; and
    display the operation image in a case where a positional relationship between the first marker visually recognized by the user through the head mounted display and the second marker becomes a predetermined positional relationship.

7. The interface control system according to claim 6, wherein the processor is further configured to detect the first marker from a partial region corresponding to the second marker displayed at a partial predetermined position on the display screen of the head mounted display.

8. The interface control system according to claim 1,
    wherein the first marker is an image displayed on a display screen of a device attached to the arm portion of the user,
    wherein the processor is further configured to:
        perform predetermined display on the display screen of the device in a case where predetermined vibration is detected by a sensor detecting vibration of the arm portion of the user; and
        determine that the operation image is operated by the user in a case where the predetermined display is imaged by the camera.

9. The interface control system according to claim 1, wherein the processor is further configured to determine that the operation image is operated by the user in a case where predetermined vibration is detected by a sensor detecting vibration of the arm portion of the user.

10. The interface control system according to claim 1, wherein the processor is further configured to detect an operation body from a part of regions defined based on the first marker among regions included in an image obtained from the camera, and determine that the operation image is operated by the user in a case where the operation body is detected from the part of regions.

11. The interface control system according to claim 1, wherein the processor is further configured to determine an operation target which overlaps the hand of the user with an area of a predetermined proportion or higher as an operation target operated by the user among a plurality of operation targets, in a case where the plurality of operation targets are included in the operation image, and where the hand of the user performing an operation on the operation image overlaps the plurality of operation targets.

12. The interface control system according to claim 1, wherein the processor is further configured to determine an operation target which is located on a leftmost part or a rightmost part as an operation target operated by the user among a plurality of operation targets, in a case where the plurality of operation targets are included in the operation image, and where the hand of the user performing an operation on the operation image overlaps the plurality of operation targets.

13. The interface control system according to claim 1, wherein the processor is further configured to, in a case where the operation image visually recognized by the user through the head mounted display overlaps the hand of the user operating the operation image, display an operation image in which an image of the hand is superimposed on a position where the hand of the user is located, on the display screen of the head mounted display.

14. The interface control system according to claim 1, wherein the processor is further configured to display only a part of the operation image according to a posture of the body of the user.

15. An interface control apparatus comprising the processor and the memory according to claim 1.

16. An interface control method executed by a computer, the method comprising:
    detecting a first marker attached to the body of a user based on an image obtained from a camera attached to the user;
    displaying an operation image on a display screen of a head mounted display mounted on the user based on the detected first marker so that the operation image is superimposed on the body of the user and is visually recognized by the user; and
determining whether or not the operation image is operated by the user,
    wherein the first marker is an image displayed on a display screen of a device attached to the arm portion of the user, and
    wherein the method further comprises extracting a feature of the background in an image obtained from the camera, and determine a shape, a pattern, or a color of the first marker displayed on the display screen of the device based on the extracted feature.

17. A non-transitory computer-readable storage medium storing a program causing a computer to execute each step according to claim 16.

* * * * *

UNITED STATES PATENT AND TRADEMARK OFFICE
CERTIFICATE OF CORRECTION

PATENT NO. : 10,698,535 B2
APPLICATION NO. : 15/575186
DATED : June 30, 2020
INVENTOR(S) : Shin Norieda, Makoto Yoshimoto and Yoshinori Saida It is certified that error appears in the above-identified patent and that said Letters Patent is hereby corrected as shown below:

In the Specification

Column 10, Description of Embodiments, Line 23; Delete "anon-transmissive" and insert --a non-transmissive-- therefor Column 17, Description of Embodiments, Line 65; Delete "system." and insert --system-- therefor Column 27, Description of Embodiments, Line 15; Delete "aside" and insert --a side-- therefor Column 32, Description of Embodiments, Line 55; Delete "system." and insert --system-- therefor Signed and Sealed this
Seventeenth Day of November, 2020

Andrei Iancu
*Director of the United States Patent and Trademark Office*